(12) United States Patent
Rhodig

(10) Patent No.: US 8,651,503 B2
(45) Date of Patent: Feb. 18, 2014

(54) VEHICLES, SYSTEMS FOR VEHICLES, AND METHODS FOR VEHICLES ALL TO IMPROVE CORNERING CAPABILITY

(76) Inventor: Michael Rhodig, Scottsdale, AZ (US)

( * ) Notice: Subject to any disclaimer, the term of this patent is extended or adjusted under 35 U.S.C. 154(b) by 673 days.

(21) Appl. No.: 12/719,850

(22) Filed: Mar. 8, 2010

(65) Prior Publication Data

US 2011/0215544 A1 Sep. 8, 2011

(51) Int. Cl.
*B60G 21/00* (2006.01)
*B62D 9/02* (2006.01)

(52) U.S. Cl.
CPC ............. *B62D 9/02* (2013.01); *B60G 21/007* (2013.01)
USPC .............. 280/124.103; 280/5.509; 280/5.521; 280/86.751; 280/86.757

(58) Field of Classification Search
USPC .................. 280/124.103, 5.509, 5.521, 5.52, 280/86.751, 86.757
See application file for complete search history.

(56) References Cited

U.S. PATENT DOCUMENTS

| | | | |
|---|---|---|---|
| 3,783,966 A * | 1/1974 | Campbell et al. ............. | 180/433 |
| 6,547,260 B2 * | 4/2003 | Laurent et al. ............. | 280/5.509 |
| 7,494,141 B2 * | 2/2009 | Bouton .................. | 280/124.103 |
| 7,530,419 B2 * | 5/2009 | Brudeli .................. | 180/210 |
| 7,648,148 B1 * | 1/2010 | Mercier ................. | 280/124.103 |
| 7,665,749 B2 * | 2/2010 | Wilcox .................. | 280/124.103 |
| 7,673,883 B2 * | 3/2010 | Damm ....................... | 280/5.521 |
| 7,712,748 B2 * | 5/2010 | Deal et al. .................. | 280/5.521 |
| 7,722,063 B2 * | 5/2010 | Dieziger ................. | 280/124.103 |
| 7,850,180 B2 * | 12/2010 | Wilcox .................. | 280/124.103 |
| 8,104,781 B2 * | 1/2012 | Gazarek ................. | 280/124.141 |
| 8,262,111 B2 * | 9/2012 | Lucas .................... | 280/124.103 |
| 8,342,548 B1 * | 1/2013 | Vey et al. ............... | 280/124.164 |
| 8,480,106 B1 * | 7/2013 | Cohen .................... | 280/124.125 |
| 2003/0102176 A1 * | 6/2003 | Bautista ........................ | 180/210 |
| 2004/0100059 A1 * | 5/2004 | Van Den Brink et al. ....................... | 280/124.103 |
| 2008/0197597 A1 * | 8/2008 | Moulene et al. ....... | 280/124.103 |
| 2010/0007109 A1 * | 1/2010 | Mighell ................ | 280/124.103 |
| 2011/0006498 A1 * | 1/2011 | Mercier ................ | 280/124.103 |
| 2012/0098225 A1 * | 4/2012 | Lucas .................... | 280/124.103 |
| 2012/0181765 A1 * | 7/2012 | Hill et al. ........................ | 280/62 |
| 2013/0168934 A1 * | 7/2013 | Krajekian ....................... | 280/62 |

OTHER PUBLICATIONS

Cohen; Shai S., Dual Suspension System, Jul. 23, 2009, USPTO, U.S. Appl. No. 61/228,034, Provisional Drawings to U.S. Appl. No. 12/841,521 (US Patent 8,480,106).*

Cohen; Shai S., Dual Suspension System, Jul. 23, 2009, USPTO, U.S. Appl. No. 61/228,034, Provisional Specification to U.S. Appl. No. 12/841,521 (US Patent 8,480,106).*

* cited by examiner

*Primary Examiner* — James English
(74) *Attorney, Agent, or Firm* — William R. Bachand

(57) ABSTRACT

A land vehicle, according to various aspects of the present invention allows the driver to lean with a frame that supports the driver and that pivots on a base. Motion of the frame is coupled to the wheels to adjust a camber of the wheels. The wheels are coupled to the base that provides a reference for independent wheel suspension mechanisms. As a result, banking of the vehicle does not affect the suspension of the wheels. Hydraulic assistance to counteract the forces of the suspension systems is unnecessary.

5 Claims, 18 Drawing Sheets

VEHICLES, SYSTEMS FOR VEHICLES, AND METHODS FOR VEHICLES ALL TO IMPROVE CORNERING CAPABILITY

BACKGROUND OF THE INVENTION

Conventional four-wheeled land vehicles depend on contact with the ground for traction. When such a vehicle travels around a curve in the road, traction may decrease on some or all of the wheels. If a suitable centripetal force is not supplied by gravity, friction, and the road against the wheels, and not communicated effectively to act on the center of mass of the vehicle, the vehicle may roll away from the center of curvature of the curve in the road. Even the beginning of a rolling motion can be hazardous at least because traction may be unevenly distributed and/or reduced, compounding the problem of supplying a suitable centripetal force.

The driver of a conventional two-wheeled vehicle may shift the center of mass of the combination of the driver and the vehicle to bank the vehicle and its wheels toward the center of curvature to reduce the likelihood of rolling. The same is not true for conventional three- and four-wheeled vehicles. Conventional three- and four-wheeled vehicles generally include systems that bias each wheel against the road for improved traction over rough roadway. These biasing systems generally inhibit further improvement of cornering capability by the driver.

Systems have been proposed that hydraulically counteract body roll in three- and four-wheeled land vehicles. Hydraulic force is used to reposition the mass of the body and/or to counteract the wheel biasing systems.

Without the present invention vehicle cornering capability will continue to be limited. A substantial risk of unstable conditions persists for vehicles that are capable of speeds while not cornering that are far greater than safe speeds while cornering.

SUMMARY OF THE INVENTION

A vehicle, according to various aspects of the present invention, follows a curve in a path on a way. The vehicle includes a frame for supporting a payload, a base, a plurality of vehicle supports, and a camber controller. The base supports the frame and permits movement of the frame with respect to the base. The plurality of vehicle supports each contribute to supporting the base. Each vehicle support biases the vehicle support generally from the base against the way and not generally from the frame against the way. The camber controller adjusts a camber of at least one vehicle support of the plurality of vehicle supports in accordance with a position of the frame with respect to the base. When the payload includes a person, movement of the frame toward the position may be promoted by a shifting of the person's mass by the person toward a center of curvature of the curve in the path. By adjusting the camber, cornering capability is improved.

A method according to various aspects of the present invention is performed by a vehicle following a curve in a path on a way. The method includes in any practical order: (a) supporting a frame with a base of the vehicle; (b) supporting the base with a plurality of vehicle supports that each contribute to supporting the base, where each vehicle support is biased generally from the base against the way and not generally from the frame against the way; (c) allowing movement of the frame with respect to the base toward a position; and (d) adjusting a camber of at least one vehicle support of the plurality of vehicle supports in accordance with the position of the frame with respect to the base. Cornering at higher speed is facilitated by adjusting the camber.

BRIEF DESCRIPTION OF THE DRAWING

Embodiments of the present invention will now be further described with reference to the drawing, wherein like designations denote like elements, the terms left and right are from the perspective of a driver looking in the direction of forward travel, and.

DETAILED DESCRIPTION OF THE PREFERRED EMBODIMENTS

Figure 1:
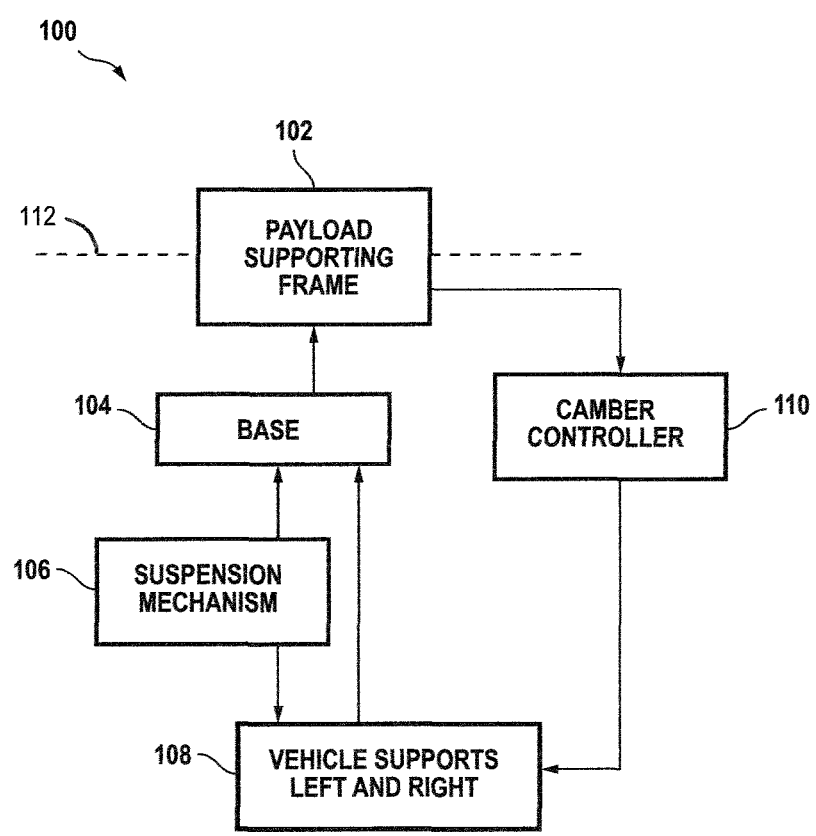
FIG. 1 is a functional block diagram of a system for a vehicle according to various aspects of the present invention.

A vehicle according to various aspects of the present invention traverses a way, being supported by the way. The way may be generally solid or fluid (e.g., pavement, gravel, sand, ice, snow, water) and referred to as a roadway, highway, waterway, railway, or the like. Such a vehicle exhibits, inter alia, improved cornering capability. Cornering capability refers generally to an ability to follow a path (e.g., a desired course of travel) along the way where the path has a curve having a center of curvature. Cornering capability is improved in part because a center of mass of the vehicle is allowed to move toward the center of curvature of the corner instead of, for example, remaining at a position of symmetry with respect to the supports of the vehicle (e.g., wheels, floats, skates, casters, skis, tires, tracks, control surfaces, wings) that support the vehicle (e.g., on a solid way, in a fluid way). A moment that would otherwise cause the vehicle to roll by increasing the force of contact on one or more supports and decreasing the force of contact on one or more other supports is counteracted in part by allowing a more even distribution of the magnitude of the forces acting through the supports. Instability of the vehicle (e.g., from the driver's perspective) generally includes a condition of uneven distribution of forces through the supports, especially, in addition, involving inertia (linear or rotational) in a direction different than along the desired path.

A system for improved cornering capability supports a payload (e.g., a human driver) on a frame that moves with respect to a base. Benefits are realized as decreasing risk of roll, and permitting following a curve in the path at increased speed to operate at the same risk of roll as in conventional vehicles.

The base is supported by several vehicle supports. Vehicle supports are biased against the way, among other purposes, to support the base, provide traction against variations of the way, and to reduce shock communicated to the base. By reducing shock to the base, shock to the frame may also be reduced, enhancing driver comfort.

According to various aspects of the present invention, movement of the frame moves the center of gravity of the frame and adjusts a camber of the vehicle supports. Movement may bring the center of gravity of the payload and frame of the vehicle toward the way. Consequently, the center of gravity of the vehicle being the combination of the payload, frame, and base is moved. Adjusting a camber of a vehicle support generally moves the center of gravity of the base toward the way with the same consequence to the center of gravity of the vehicle. By moving the center of gravity of the vehicle closer to the way, more energy is required to obtain an unstable condition of the vehicle such as the onset of roll.

According to various aspects of the present invention, movement of the payload and the frame, and adjustment of camber, have the additional effect of moving the center of gravity of the vehicle toward the center of curvature of a curve in the path. When the center of gravity of the vehicle is closer to the center of curvature of the curve in the path, increased energy is required to obtain an unstable condition of the vehicle such as the onset of roll.

For example, system 100 represents a vehicle (or portion of a vehicle) that exhibits improved cornering capability. Propulsion, steering, and braking subsystems are not part of system 100 as shown. System 100 may be used in tow behind a directed prime mover. Another implementation may include propulsion, steering, and braking subsystems of conventional technologies to achieve a self propelled, self-directed vehicle. System 100 of FIG. 1 includes payload supporting frame 102 (also simply called a frame hereafter), base 104, suspension mechanism 106, several vehicle supports 108, and a camber controller 110.

A payload supporting frame may include any conventional structure (e.g., container, platform, rigging, seats) for supporting a total mass to be carried by system 100. The payload may include animate and/or inanimate objects. An inanimate payload is secured to the frame to avoid shifting of the payload with respect to the frame during movement of the vehicle. An animate payload may be trained to shift toward the center of curvature of a curve in the path to promote (e.g., initiate, follow, exaggerate) movement of the frame with respect to the base. For example, frame 102 may include a frame constructed of welded steel tubing, at least a partial enclosure (e.g., windshield, canopy, body), and a seat on which a passenger is seated during travel of vehicle 100 along a path.

A base supports a frame and allows the frame to move with respect to the base. Movement may be rotational about an axis, for example an axis in the direction of travel. Movement may be translational on a line or curve that crosses through a vertical plane that includes an axis in the direction of travel. For example, base 104 may be constructed of welded steel tubing and include two or more pivots of conventional technology (e.g., arcuate or circular bearings of base 104 supporting cylindrical shafts of frame 102, one or more bearings of frame 102 supported by one or more surfaces of base 104). Pivots located on an axis 112 may permit frame 102 to move (e.g., turn, bank, sway, rock, orbit) about axis 112. As another example, base 104 may include one or more linear bearings (e.g., a rack for one or more pinions of frame 102, a linear raceway of bearings for a tongue to traverse, a plurality of arms that pivot on base 104 and pivot on frame 102 for nonlinear translation), that permit frame 102 to move left or right of a central position.

A straight ahead operating position of frame 102 with respect to base 104 is a position for which no camber adjustment is desired. The straight ahead operating position may be defined by symmetry of the vehicle, location of axis 112, or with reference to a direction of travel (e.g., neither left nor right of the path). The straight ahead operating position may be a position having an equal rotation or translation to the left of the path as to the right of the path. A straight ahead operating position may be a position of equilibrium obtained by gyroscopic stabilization of system 100 (e.g., a conventional balance control system, a trained driver maintaining balance assisted by the gyroscopic effect of wheels turning to support the vehicle on a roadway). Any conventional mechanism may introduce hysteresis around the straight ahead operating position to reduce the effect of vibration or reduce undesired disturbances (e.g., reacting to rough roadway).

A suspension mechanism applies a bias from the base onto a vehicle support against the way. The bias supports the base and tends to maintain a vehicle support in contact with the way. A suspension mechanism may be implemented with any conventional technology, provided that it operates between a base and one or more vehicle supports without interaction with the frame (except indirectly via the base). A conventional linear shock absorber may be mounted via a joint of the base and mounted via a joint of one vehicle support (e.g., independent suspension of one wheel, skid, skate, float, track, truck of wheels, control surface, or wing). In another implementation, a torsion bar may be attached to the base and used to support a pair of vehicle supports. For example, suspension system 106 may be implemented for a four-wheeled vehicle as four conventional linear shock absorbers, one for each of four vehicle supports for a conventional independent suspension between the base and the wheels of the vehicle supports.

A vehicle support supports a vehicle so that the vehicle may travel on the way without undesirable friction. Using conventional technology, vehicle supports in cooperation with a suspension mechanism may maintain a distance between the base and the way. For a land vehicle, each vehicle support may be implemented with a wheel, skid, skate, track, or truck of any of these. For a water vehicle, each vehicle support may be implemented with a float, hull, fin, or assembly of several of these. For example, vehicle supports 108 may be implemented with a conventional inflated rubber tire, rim, hub, backplate (also called a knuckle), and control arms that connect the backplate to the base. In another implementation, vehicle supports 108 are implemented with a railway wheel for travel on a fixed track of a railway.

A camber controller adjusts an angle (or average angle) of a vehicle support with respect to the way to adjust a distance from a center of mass of the vehicle and the way. By reducing such a distance before or during traversal of a curve in the path, a risk of rolling the vehicle may be reduced as discussed above. When a vehicle support is implemented as a wheel spinning in a plane on an axle that intersects the plane, camber control may affect the magnitude and/or sign of an angle the plane makes with the way. In one implementation for a vehicle support having a rotating wheel on an axle, a lower arm connects via a joint at the base to a joint of a backplate below the axle, providing a reference distance of the wheel from the base; then, a control arm connects via a joint at the frame to a joint at the backplate above the axle. With the lower arm at a reference length, the control arm may adjust and maintain a positive or negative camber of the wheel by extending toward or away from the frame. Further, by moving the control arm with the frame to the left or to the right of a straight ahead operating position of the frame, camber control may be achieved (e.g., obtaining and/or maintaining a positive or negative camber adjustment). In another implementation where camber oscillates about an average camber value (e.g., flutter of a vehicle support in a fluid), camber control may affect the average camber value using any conventional technology.

For example, camber controller 110 may include a respective mechanical linkage from the payload supporting frame 102 to each vehicle support 108. An adjusted camber is, by the linkage, responsive to the position of frame 102 with respect to base 104. In another implementation, the respective mechanical linkages are replaced with a control system that includes a conventional sensor of frame position, conventional actuators that move one or more vehicle supports in accordance with an output of the sensor, and a control circuit (e.g., analog, digital, programmed computer) that drives the actuators in accordance with one or more signals supplied by the sensor.

Camber of vehicle supports 108 in one implementation is essentially identical in degree to angle of movement of frame 102 about axis 112. In another implementation a difference between these angles is less than about 5%.

A mechanical linkage includes any apparatus that accepts an input force through a range of motion at a first location and provides an output force through a range of motion at a different location. Mechanical linkages are of well known construction and generally comprise one or more generally rigid segments and one or more pivot points. Rigid segments are called links, levers, or arms. For example, a camber controller 110 according to various aspects of the present invention comprises a mechanical linkage. In one such implementation, two arms (one from frame 102 and one from a vehicle support 108) join at a central pivot that is supported by a link that pivots at the central pivot and also pivots at base 104. The link directs the arms on an arc centered at its pivot at base 104 and translates the arcuate movement of the frame with respect to the base to a primarily horizontal movement at the vehicle support. According to various aspects of the present invention, the interaction of the link and the arms implements camber adjustment, caster adjustment, and may implement minor toe adjustment. The caster adjustment reduces dive and/or squat. The tow adjustment (if implemented) reduces scrub for tracking about various radii from a center of curvature of a curve in the path.

A method, according to various aspects of the present invention, is performed by a vehicle to transport a payload along a path on a way. The path may be arbitrary and include one or more curves, each curve having a respective center of curvature for at least a portion of the curve. By performing the method, a vehicle is capable of staying on the path without onset of instability while traveling at relatively higher speed than the maximum speed that a conventional vehicle could travel the path without the onset of instability. To accomplish this goal, the method includes adjusting a camber of a support for a base of the vehicle in response to motion (e.g., in accordance with a position) of a support for the payload with respect to the base.

Figure 2:
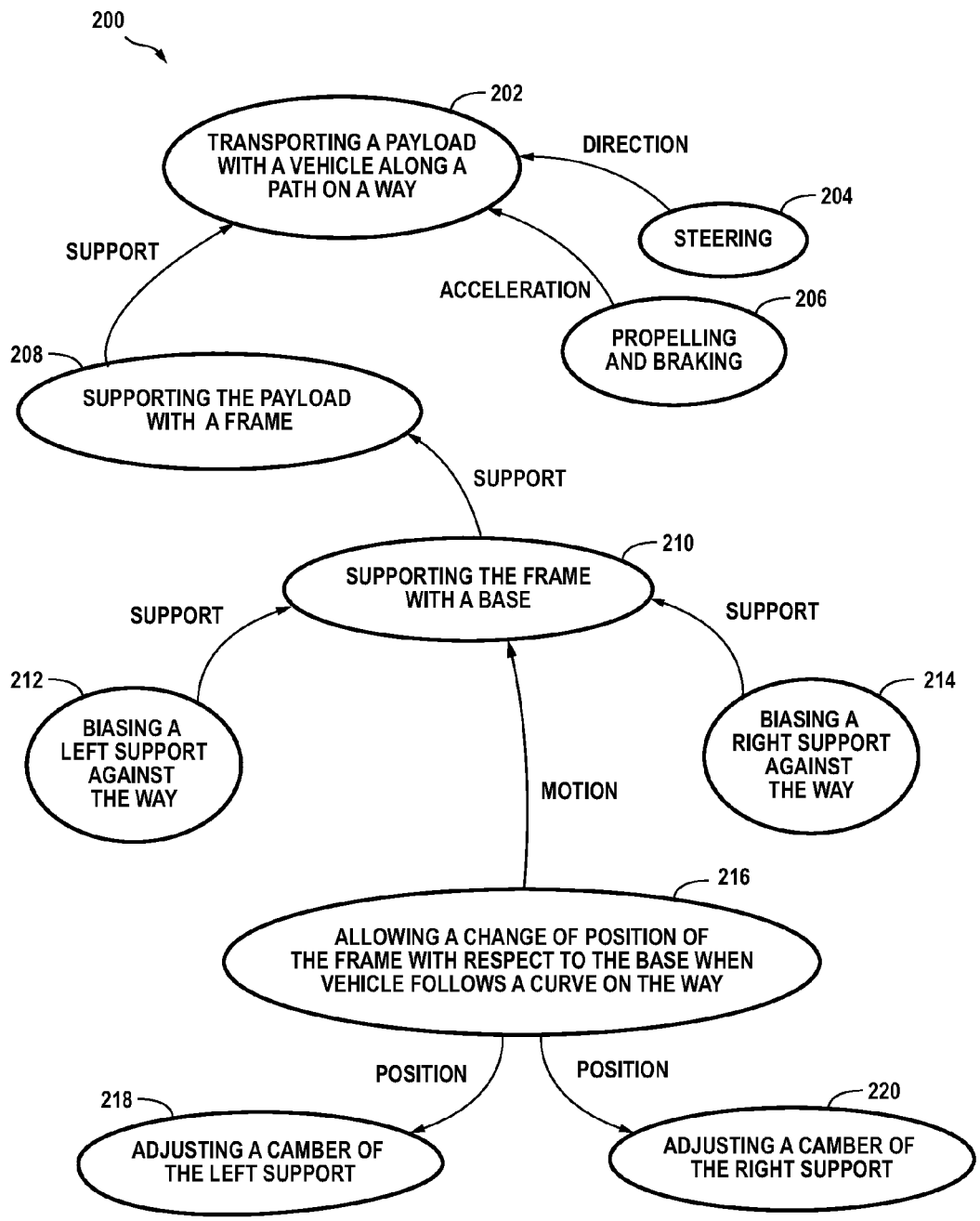
FIG. 2 is a functional flow diagram for a method performed by a vehicle according to various aspects of the present invention.

For example, method 200 of FIG. 2 is shown comprising several processes where any one or more processes of the method may be performed individually, sequentially, or overlap in time with any other process of the method. In other words each process is performed when conditions sufficient for performance exist and for as long as desired to provide a desired output of the process. Method 200 includes processes for transporting (202), steering (204), propelling and braking (206), supporting with a frame (208), supporting with a base (210), biasing (212, 214), allowing change of position (216), and adjusting camber (218, 220). For clarity of presentation, method 200 may be performed by system 100 or a vehicle comprising system 100 as discussed above. In other implementations, method 200 may be performed by a vehicle different from system 100.

Transporting (202) a payload with a vehicle along a path on a way may be accomplished in part by supporting (208) the payload against gravity. The vehicle tends toward contact with the way by action of gravity and/or momentum.

Transporting may be accomplished with or without steering (204) provided by the vehicle in any conventional manner. Steering (204) provides direction to transporting (202). In the absence of a process for steering, the vehicle may be towed or pushed by another steered vehicle of the present invention or of any conventional technology. Transporting may be accomplished with or without propelling and braking (206) provided by the vehicle in any conventional manner. Propelling and braking provide acceleration (both positive and negative) to transporting (202). Any conventional forms of propulsion and/or braking may be used. Propulsion may be implemented with external combustion (e.g., steam plant), internal combustion, electricity, and/or magnetism. For a first example, propulsion (and/or braking) may be accomplished by a prime mover coupled to the way. For a second example, propulsion (and/or braking) may be accomplished using rocket technology independent of the way. An energy sink for braking may include any conventional braking technology (e.g., energy conversion, friction, generation of electricity, state change of matter, condensation, compression).

Supporting (208) the payload with a frame of the vehicle may be accomplished with one or more general purpose structures (e.g., boxcar, flatbed, tank), and/or with structures particular to the type of payload. For example, a human (e.g., a driver or passenger) may be supported by a seat (while seated) and/or pegs (while seated or standing). A structure for steering (204) may provide support for a driver or provide balance for improved support of the driver. Structures and materials for steering, propelling, and/or braking (and/or controls therefor) may be part of the payload to establish a desired position of the center of mass of the frame and/or a desired position of the center of mass of the vehicle.

Supporting (210) the frame with a base may be accomplished with one or more conventional bearings. The materials in contact at the bearing may be solid, fluid, liquid, or gas. Retaining the frame and base at the bearing may be accomplished with any conventional technology (e.g., captive surfaces, fasteners, gravity, fluid pressure, magnetism). Supporting (210) may be performed within a range of motion (e.g., plus or minus 45 degrees of rotational motion about a longitudinal axis such as axis 112). The range may be limited by mechanical stops that abut the frame.

The vehicle may be maintained in contact with the way by biasing two or more vehicle supports against the way. Method 200 as shown in FIG. 2 involves two vehicle supports. In an implementation where the vehicle has more than two vehicle supports, the vehicle may practice method 200 with any two or more of its vehicle supports.

Biasing (212, 214) a left and a right support against the way may be accomplished by a left vehicle support that provides support to the base, and a right vehicle support that provides support to the base. For balance and/or symmetric movement when cornering to the left or to the right, vehicle supports of method 200 may be located generally to the left and to the right of a center of mass of the vehicle. Biasing may be accomplished with any conventional technology including independent suspension, shock absorption, and/or load shifting. Biasing may be adjusted dynamically in accordance with machine vision of the way on the path just ahead of a vehicle support.

Biasing (212, 214), according to various aspects of the present invention, is generally with reference to the base. Biasing (212, 214) does not generally operate to originate a force or reaction against the frame that is not communicated to the frame via the base. By referring biasing to the base, movement of the frame is more responsive to gravity, centripetal force, and action by an animate payload such as a driver than to the forces used for biasing. In one implementation more than 50% of the force for biasing is referenced from the base. In another implementation, more than 80% of the force for biasing is referenced from the base. Preferably, more than 95% (e.g., essentially 100%) of the force for biasing is referenced from the base. A portion of the force for biasing may be referenced to the frame such as when the center of gravity of the frame moves left or right away from a central axis. However, according to various aspects of the present invention, this contribution from the frame is indirect and contributes primarily through the base (e.g., via a pivot between the frame and the base).

Allowing (216) change of position of the frame with respect to the base as the vehicle follows a curve on the way may be accomplished in part by supporting the frame on a bearing as discussed above. Allowing symmetric change of position may be accomplished, as desired, by employing symmetry in the frame and/or arrangement of the payload. Allowing change of position includes permitting the frame to move from a straight ahead operating position of the frame with respect to the base toward a second position. The second position may be attained and maintained, for example, during cornering at a constant radius of curvature measured from a center of curvature. In one implementation, motion of a top portion of the frame toward the left of the vehicle involves nearly identical force (positive or negative) as motion of the top portion of the frame toward the right of the vehicle. In such an implementation, the center of mass of the frame and payload may be balanced (held at equilibrium) with respect to the base. In another implementation (e.g., where higher speeds are desired when cornering to the left than when cornering to the right) the center of mass of the frame may not have a point of equilibrium in symmetry with the base.

According to various aspects of the present invention, a camber of at least one vehicle support is adjusted in response to motion (e.g., in accordance with a position) of the frame of a vehicle with respect to the base of the vehicle. To accomplish such adjusting, the frame may be mechanically coupled to the vehicle support in any conventional manner. In another implementation, adjusting is accomplished with a control system that includes a sensor of frame position and an actuator for adjusting camber. Any conventional control apparatus (e.g., mechanics, hydraulics, magnetics, electronics) may couple the sensor to the actuator. Control may be in accordance with any combination of position, velocity, and/or acceleration of the frame with respect to the base. Conventional sensors of frame position and/or of payload position may be used. Conventional actuators of camber adjustment of one or more vehicle supports may be used. Camber adjustment may be accomplished with a force against the frame and/or the base. According to various aspects of the present invention, more than 50% of the force for adjusting camber is provided by the frame. In another implementation, more than 85% of the force for adjusting camber is provided by the frame. In another implementation, more than 95% (e.g., essentially 100%) of the force for adjusting camber is provided by the frame. In still other implementations, where the position of the frame is monitored by one or more sensors and camber control is effected by one or more actuators, camber control is accomplished primarily without (e.g., less than 5%) force against the frame.

A camber controller (110) that adjusts (218) a camber of a vehicle support according to various aspects of the present invention may comprise a mechanical linkage. For example, a mechanical linkage may comprise one or more links (e.g., rigid members, springs, shock absorbers) coupled at one or more pivots (e.g., fixed to the frame, fixed to the vehicle support, fixed to the base, not fixed to any of the foregoing) for communicating force from a frame to a vehicle support. The geometry of these members and pivots provide mechanical advantage according to the distances and ratios of distances between pivots.

Figure 3:
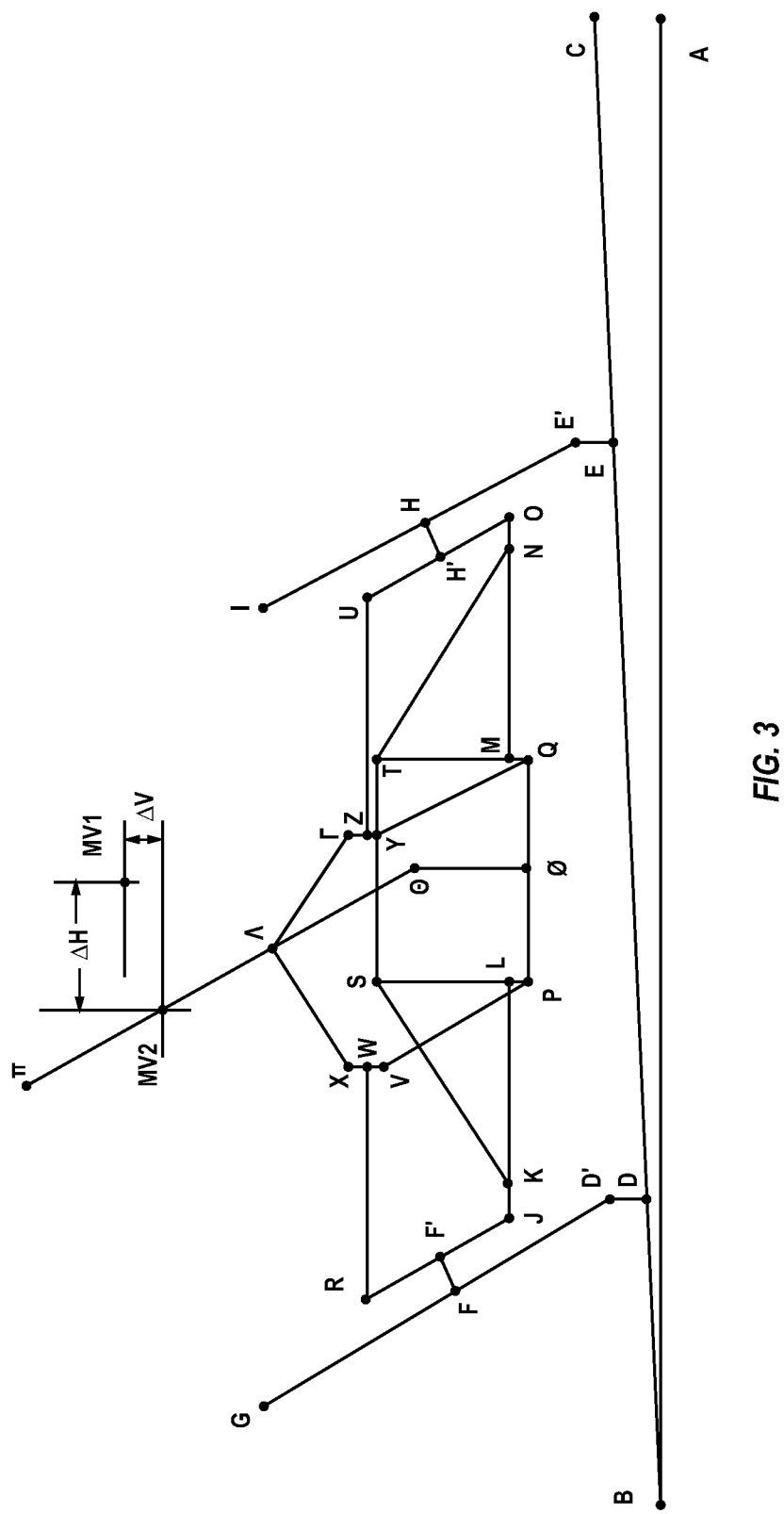
FIG. 3 is a diagram of vehicle geometry for a vehicle comprising a system according to FIG. 1 on a banked and curved path on a way.
Figure 4:
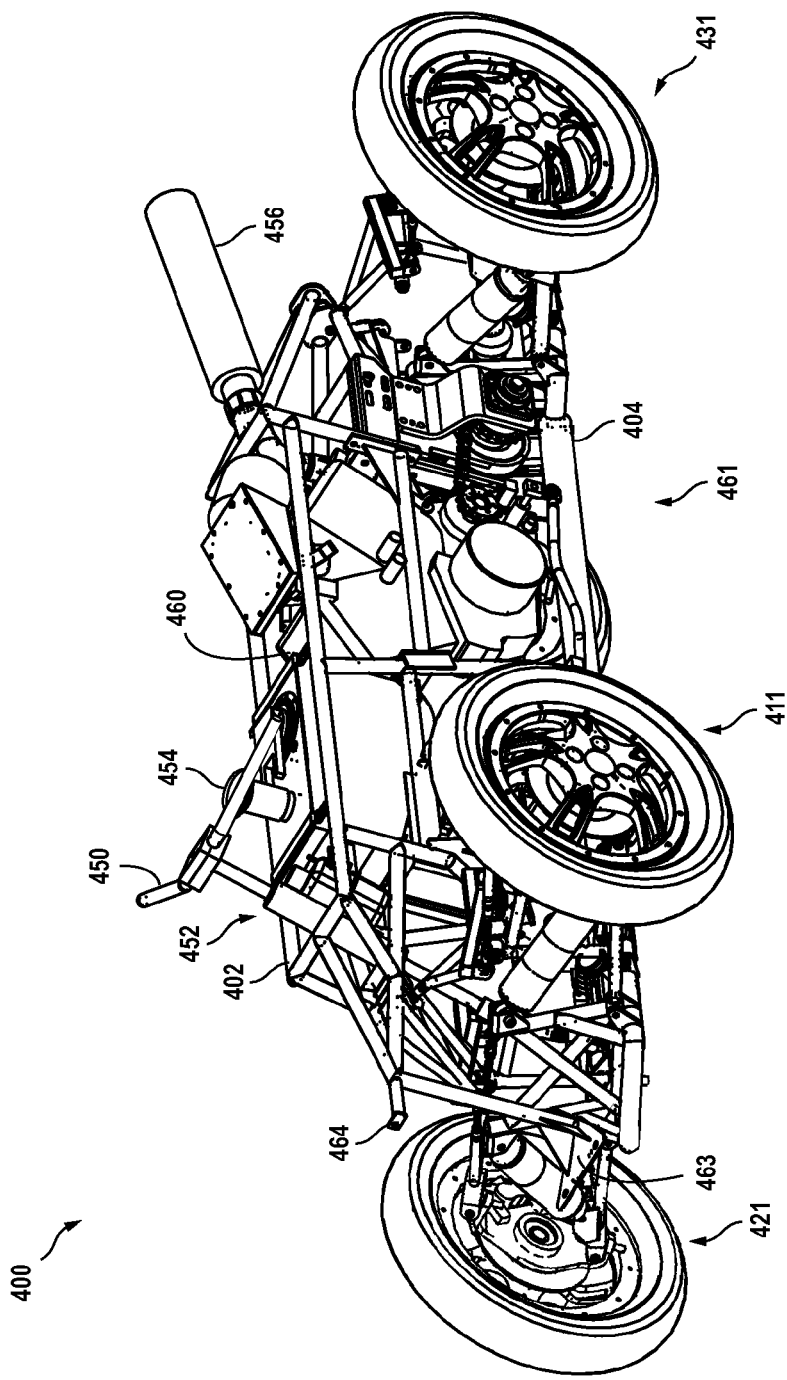
FIG. 4 is a perspective plan view showing the left side of a land vehicle in one implementation according to the systems and methods of FIGS. 1, 2, and 3 where an upper portion of the frame is at a position left of a straight ahead operating position.
Figure 5:
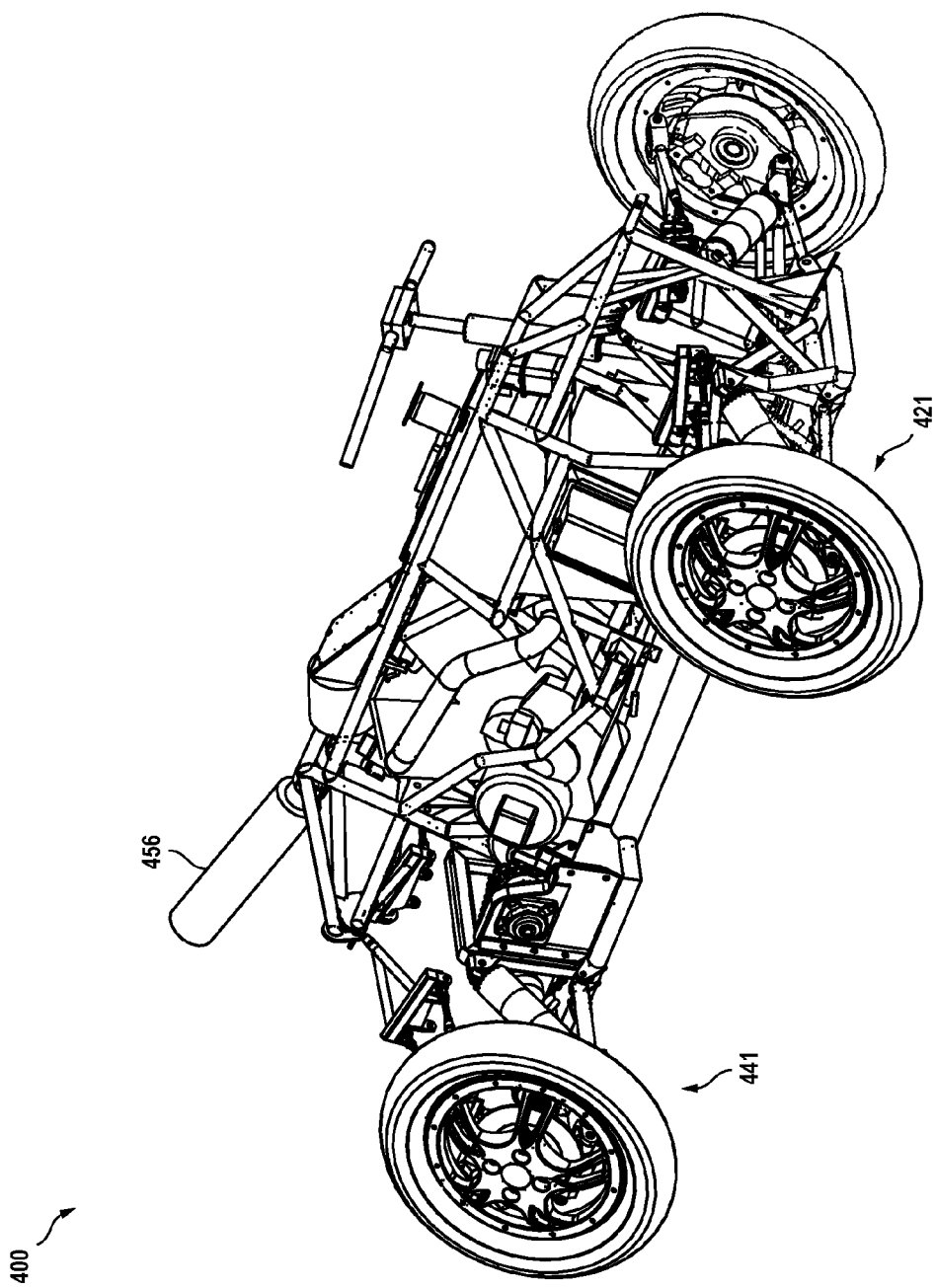
FIG. 5 is a perspective plan view showing the right side of the land vehicle of FIG. 4.
Figure 6:
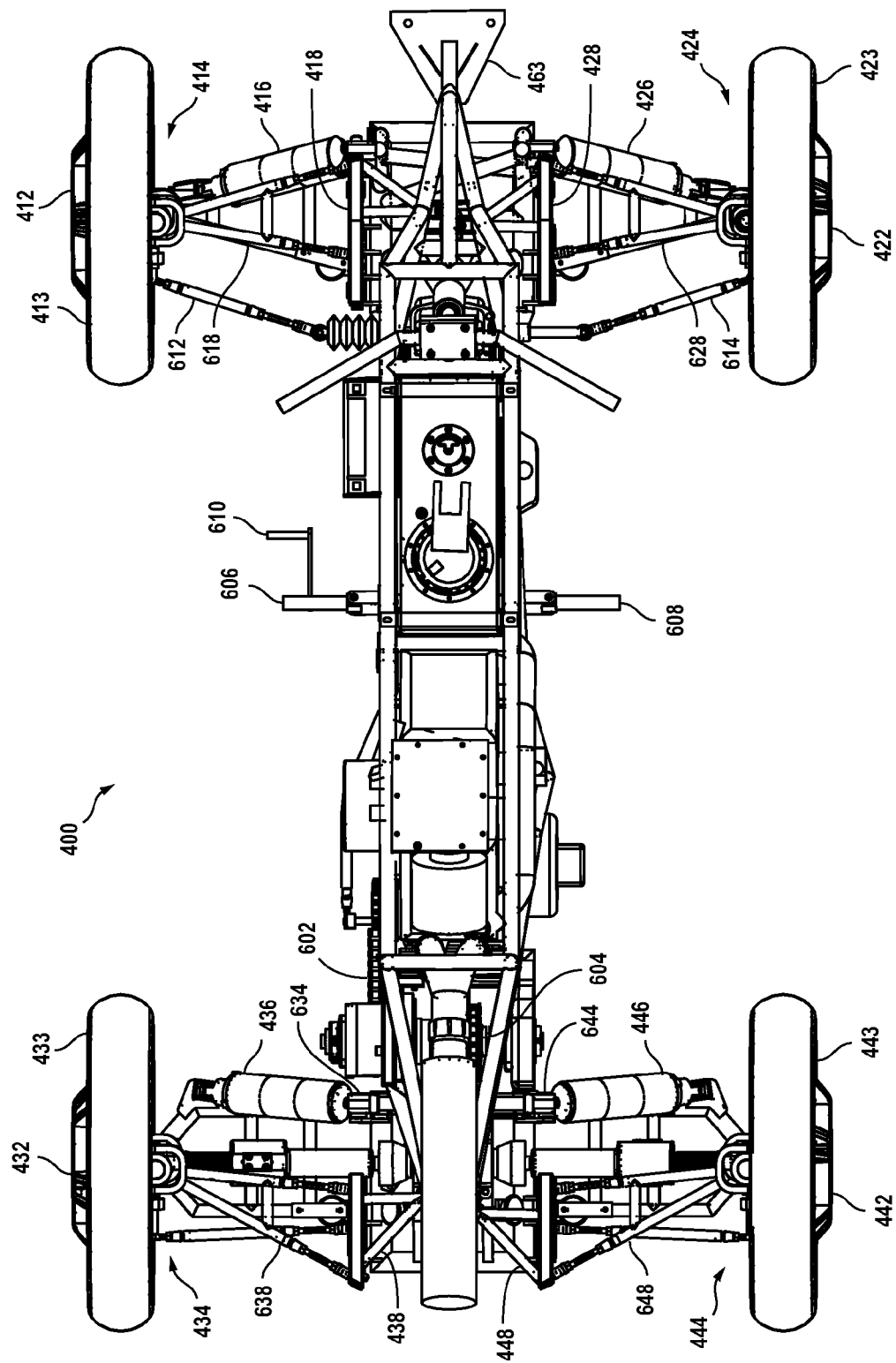
FIG. 6 is a plan view of the top of the vehicle of FIG. 4 where the frame is at a straight ahead operating position with respect to the base.
Figure 7:
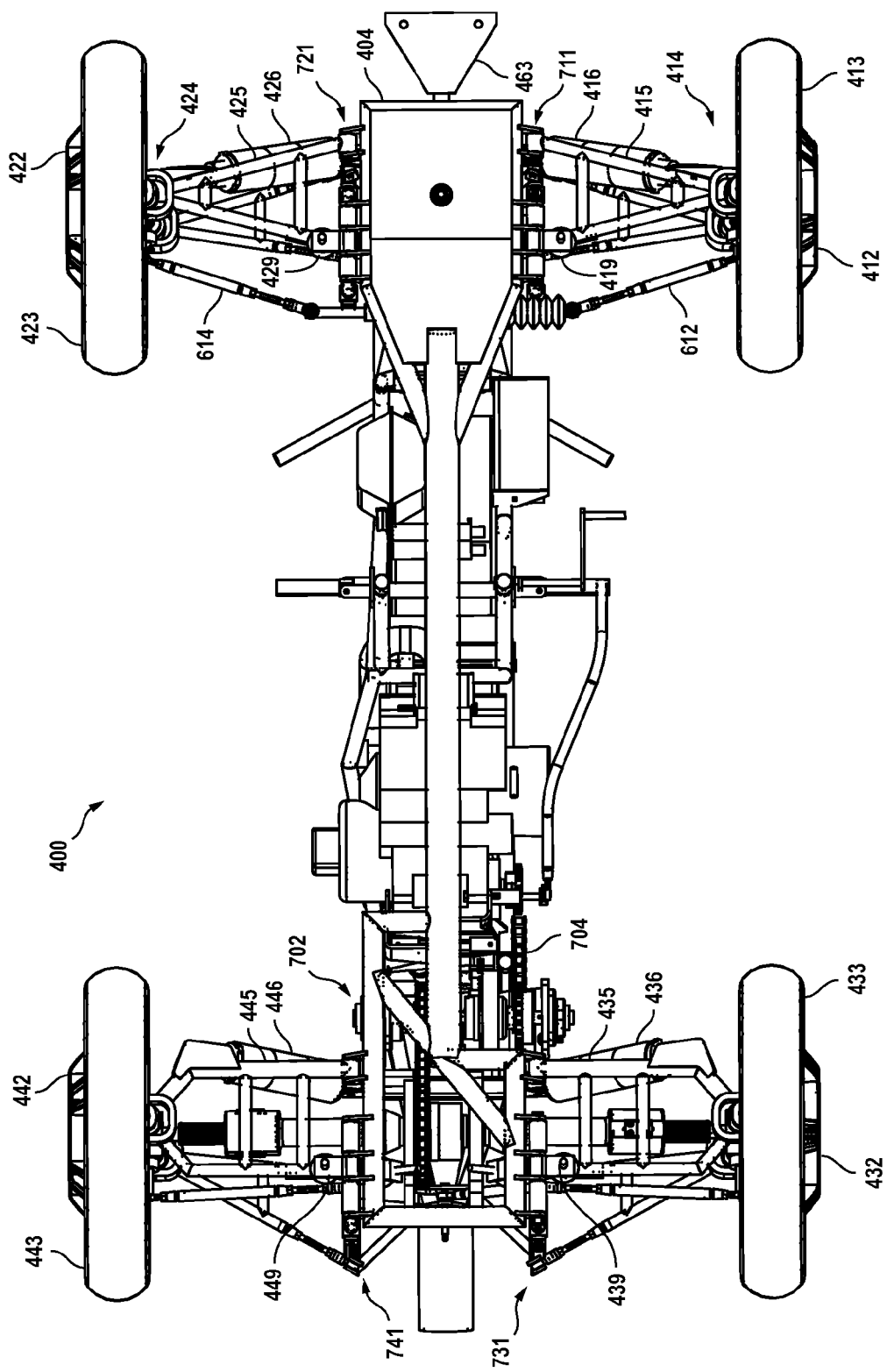
FIG. 7 is a plan view of the bottom of the vehicle of FIG. 4 where the frame is at a straight ahead operating position with respect to the base.

For example, FIG. 3 presents a planar diagram of vehicle geometry for a vehicle comprising a system according to FIG. 1 on a curve in a path on a banked way. As discussed below, segments are rigid, have fixed length (unless otherwise noted), and pivot (if at all) at one or both end points unless the angle at the point is described as fixed or the polygon that includes the angle is described as rigid. The geometry of the diagram is to scale at an aspect ratio where angle ABC is 7 degrees. Segment AB is part of a reference line defining horizontal. Gravity is vertical, being perpendicular to segment AB.

In FIG. 3, The vehicle is proceeding into the page and cornering to the left so that left, right, top, and bottom, as discussed above correspond to the left, right, top, and bottom of FIG. 3 in a viewing orientation. As shown, cornering speed of the vehicle causes a camber angle of about minus 30 degrees. Segment BC corresponds to the surface of the way where the bank angle ABC discourages rolling away from a center of curvature (to the far left, not shown). To arrive at the center of curvature of the curve in the path, begin at point C and proceed beyond point B. The vehicle is in contact with the way at points D and E of segment BC.

Segment JR (OU) corresponds to a backplate portion of a vehicle support. Segment D'G (E'I) that includes a center F (H) corresponds to a supporting portion of a vehicle support. Conventional structures (not shown) maintain segment JR (OU) primarily parallel to vehicle support D'G (E'I). For instance segment FF' may be perpendicular to segment D'G at point F. Pivots at points J (O) and R (U) may be positioned out of a plane parallel with D'G (variously distanced from a backplate) to improve handling or to facilitate adjustments that compensate for manufacturing tolerances and misalignment due to wear.

In one implementation, segment D'G (E'I) corresponds to the diameter of a wheel rotating at point F' (H'). Segment FF' (HH') may correspond to a an axis of rotation implemented with a spindle or short shaft that is fixed at F (H) or F' (H') and supported in a bearing at the other end of the spindle or shaft.

In another implementation, a segment F'H' corresponds to an axis of rotation (e.g., center of an axle). If segment F'H' comprises an axle, the length of segment F'H' is preferably variable to permit adjusting camber with respect to a point below segment F'H' (e.g., at points J and O). In other implementations, each vehicle support is driven by a half axle.

Point D (E) corresponds to the central contact of the vehicle support and the way. When D'G is an inflated tire, point D corresponds to a central point of the tire patch (contact area) on the road.

Rigid polygon PQTS corresponds to a base. Segment PQ includes point Φ. Segment ΦΘ is fixed and perpendicular to segment PQ so that base PQTS supports a frame (not shown) that pivots at Θ. Structure to support Θ at a fixed position with respect to base PQTS may take any conventional shape, including structure that comprises segment ΦΘ (e.g., post, plate) or omitting structure following the segment ΦΘ (e.g., arch brace, triangular braces).

Segment PS (QT) includes point L (M). Segment (MO) corresponds to a fixed length lower arm that pivots at both ends. Segment LJ (M) includes point K (N). Segment KS (NT) corresponds to a linear shock absorber of variable length mounted to pivot at both ends.

Segment ΘΠ corresponds to an imaginary line from point Θ, where the frame is allowed to pivot with respect to the base, to the point Π corresponding to the center of gravity of the payload being transported by the vehicle. Point Λ of segment ΘΠ corresponds to a pivot of the frame for controlling camber of the supporting portion D'G (E'I) of a vehicle support.

Segments ΛΓ (ΛX) and ΓY (XV) meet at a fixed angle. Segment ΓY (XV) includes point Z (W).

In one implementation, when on a level way (not shown), segment ΠΘ is vertical and base segment PQ is horizontal. Centers F and H of vehicle supports are equidistant from the way, so an imaginary line FH (e.g., axle axis) is horizontal. With a symmetric base, segments PS and QT are identical in length, so segment ST is horizontal. With symmetric suspension, segments KS and NT are of identical length. Segments QY and PV are vertical. Segments VX and YT are vertical. Supports D'G and E'I are vertical, that is, without camber adjustment.

In contrast, when cornering as shown in FIG. 3, segment ΘΠ is allowed to move from vertical to the position shown, pivoted at point Θ. Point Λ of segment ΘΠ is now at a position left of vertical having moved counterclockwise on an arc about point Θ. Segments ΛΓ and ΓY (fixed to each other at point Γ) have moved pivots Z and Y to the left as well. Consequently, backplate OU (and support E'I) is maintained within a few degrees of parallel to segment ΘΠ for an adjusted camber because fixed length segment ZU pivots at Z and at U and fixed length segment QY pivots at Q and Y. By symmetry, segments ΛX and XV (fixed to each other at point X) have moved pivots W and V to the left as well. Consequently, backplate JR (and support D'G) is maintained within a few degrees of parallel to segment ΘΠ for an adjusted camber because fixed length segment WR pivots at W and at R and fixed length segment PV pivots at P and V.

Due to movement of the frame with respect to the base, a center of mass of the vehicle (MV1) including base and frame may move (MV2) closer to the way by a distance ΔV and closer to the center of curvature of the curve in the path by a distance ΔH. The center of mass of a symmetric vehicle may be on a line that includes segment ΦΘ. When the frame (and/or payload) includes substantial mass, for example as taught below, the center of mass of the base and frame (and payload) may be above the point Θ. As shown in FIG. 3, points MV1 and MV2 are equidistant from point Θ and are part of an arc, not shown, centered at Θ. By locating the center of mass of the loaded vehicle (including, inter alia, base, frame, and payload) above the point (or travel) of movement of the frame with respect to the base, adjusting camber may be accomplished with a decrease in the potential energy of the vehicle (i.e., positive values of ΔV).

According to various aspects of the present invention, camber adjustments to vehicle supports D'G and E'I are made with little if any change in the length of segments KS and NT. A camber controller, according to various aspects of the present invention, comprising a polygon of pivot points such as Z, U, O, Q, and Y does not include a segment that varies in length for the purpose of biasing a vehicle support against the way. As a result, when the surface BC remains flat (though possibly at an angle as shown in FIG. 3), the length of segments KS or NT is not required to change to adjust camber.

When the surface BC is at an angle to the horizontal, line ΘΠ is at an angle to vertical. When symmetric suspension is used, the new position of the center of mass of the vehicle including base, frame, and payload (not shown) may change the lengths of segments TN and KS. In one implementation, segment TN is shorter than segment KS for the vehicle orientation as in FIG. 3.

The geometry of FIG. 3 promotes and evidences a counter-rotation of base 104 with respect to frame 102 about axis 112. When frame 102 rotates counterclockwise while cornering, base 104 rotates clockwise. Consequently, base 104 (PQ shown parallel to AB) remains nearly horizontal (e.g., less than about 5 degrees to reference line AB) when frame 102 (ΛΘ) is positioned at about minus 30 degrees from vertical.

Applicant has discovered, inter alia, that conventional suspension interferes with improved cornering. If linear suspension subsystems are implemented on varying length segments KV and NY, the resistance to changes of length of such suspension subsystems would have to be overcome to adjust camber. This requirement is eliminated in the geometry of FIG. 3. From FIG. 3 it is readily apparent that a differential length KS minus NT is far less than the differential length KV minus NY.

The geometry explained with reference to FIG. 3 includes dimensions, angles, and ratios of dimensions that accomplish the benefits discussed herein as benefits of the present invention. These dimensions, angles, and ratios may be derived from the locations of points listed in TABLE 1, given in inches. Locations in TABLE 1 correspond to an implementation of the system and method of FIGS. 1-3 as discussed below with reference to FIGS. 4 through 18.

TABLE 1

| Point | X location | Y location |
|---|---|---|
| A | 90.13 | 0.00 |
| B | 0.00 | 0.00 |
| C | 90.13 | 3.87 |
| D | 19.09 | 0.82 |
| D' | 19.09 | 3.31 |
| E | 66.67 | 2.86 |
| E' | 66.67 | 5.55 |
| F | 14.17 | 11.82 |
| F' | 16.20 | 12.99 |
| G | 8.00 | 22.47 |
| H | 61.97 | 13.96 |
| H' | 59.96 | 12.83 |
| I | 55.98 | 24.71 |
| J | 18.09 | 9.35 |
| K | 20.36 | 9.35 |
| L | 33.23 | 9.36 |
| M | 46.99 | 9.34 |
| N | 59.86 | 9.35 |
| O | 62.13 | 9.35 |
| P | 33.22 | 8.10 |
| Q | 47.00 | 8.10 |
| R | 13.37 | 18.47 |
| S | 33.23 | 17.69 |
| T | 46.98 | 17.69 |
| U | 56.71 | 18.06 |
| V | 28.03 | 17.08 |
| W | 28.03 | 18.24 |
| X | 28.05 | 19.37 |
| Y | 42.05 | 17.93 |
| Z | 42.03 | 18.37 |
| Θ | 40.11 | 15.10 |
| Γ | 41.99 | 19.49 |
| Λ | 34.98 | 23.98 |
| Φ | 40.11 | 8.10 |
| π | 26.17 | 39.24 |

The ranges described in TABLE 2 are based on the geometry of FIG. 3 as implemented in the vehicle of FIGS. 4-18.

TABLE 2

| Parameter | Range | Comment |
|---|---|---|
| angle at Θ | from −44 degrees to +44 degrees measured from perpendicular to segment BC on a level way | 0 degrees corresponds to the straight ahead operating position |
| segment KS (NT) | from 11.66 inches to 13.96 inches | operating range of shock absorber |
| angle TMN (SLK) | From 77.7 degrees to 97.6 degrees | may be further limited when vehicle support is at maximum camber to account for mechanical limits of other joints |
| LP (MQ) | 1.25 inches | This distance is fixed |
| Θ above FH | From 1.15 inches to 4.26 inches | Both values are during full lean (full camber) 1.15 outside wheel, 4.26 inside wheel |
| LM below FH | from 1.48 inches to 4.61 inches | Both values are during full lean (full camber) 4.61 outside wheel, 1.48 inside wheel |
| PQ below LM | 1.25 inches | This distance is fixed |
| segment ΘΛ | 10.25 inches | This distance is fixed |
| angle XΛΘ | from 19 degrees to 102 degrees | |
| difference in length of segment JL (OM) from length of segment RW (UZ) | 15.13 inches 14.68 inches | LCA and UCA length is fixed, therefore the difference in length is fixed at 0.45 inches. |
| distance FH | from 47.5 inches to 48.26 inches | |

A system 100 that performs method 200 and implements the geometry of FIG. 3 may be incorporated into a four-wheeled, self-propelled, land vehicle. For example, vehicle 400 of FIGS. 4 through 18 is one implementation of such a vehicle. Vehicle 400 implements four vehicle supports. All four vehicle supports use identical parts as much as possible including, for example, identical tires, wheels, and shock absorbers. Front vehicle supports differ from rear vehicle supports, for example, inter alia, as front have steering capability exclusively, and rear have propelling capability exclusively. Left-right symmetry applies to the front two vehicle supports and to the rear two vehicle supports, including components for supporting the base, steering, braking, and propelling. Pivots discussed with reference to FIG. 3 are implemented with conventional joints (e.g., hinges, pins, devises, ball joints, constant-velocity joints, universal joints, splines, journaled collars).

A major safety advantage of such a vehicle is evident when the vehicle is sliding. When sliding, the payload remains elevated from the way, avoiding damage or injury which may result from contact with the way. In the implementation discussed below, the vehicle is designed for carrying a payload comprising one or two persons, riding the vehicle in the conventional manner one would ride a motorcycle. Having four wheels against the way, such a vehicle has more traction and is less likely to slide than a two wheeled vehicle of the same mass. Adjusting camber of vehicle supports, that include wheels, involves overcoming the gyroscopic forces of the rotating wheels.

The mass supported by the frame may include many of the components of the vehicle including for example driver's controls and displays, an internal combustion engine, a fuel tank (e.g., gasoline), a transmission, a battery, a starter motor, an oil pump and cooler, a water pump and radiator, air intakes and a carburetor, and an exhaust system. Having a relatively large mass supported by the frame enables motion of the frame (e.g., derived from gravity, angular momentum, linear momentum) to provide force sufficient to adjust camber of all four wheels, overcoming inter alia the gyroscopic forces of these wheels when rotating at relatively high RPM.

Vehicle 400 of FIGS. 4 through 18 includes frame 402 supported by base 404 at two pivots 1302 and 1502 that define a longitudinal axis of rotation (not shown). The longitudinal axis corresponds to a longitudinal vector of direction (112) when driving straight ahead. The frame moves clockwise to a stop 1306 (e.g., plus 44 degrees) or counterclockwise to a stop (not shown) (e.g., minus 44 degrees). The angle of movement may be measured from a reference plane that includes the longitudinal axis and a line perpendicular to the way with positive angles of frame movement (clockwise) for turns to the right and negative angles of frame movement (counterclockwise) for turns to the left. An angle of zero degrees may correspond to a straight ahead operating position of the frame with respect to the base. In FIGS. 4, 5, 9, 10, 12, 13, 15, and 18 frame 402 is at a position corresponding to a negative angle having moved counterclockwise as when cornering to the driver's left. In FIGS. 6, 7, 8, and 11 frame 402 is at the straight ahead operating position. In one implementation, frame 402 and base 404 are constructed of welded sections of steel tubing. Unless otherwise noted, conventional technologies may be used in the construction of all systems, subsystems, and components of vehicle 400.

Frame 402 supports driver's controls and displays (not shown) including a steering handle bar 450, a radiator for engine coolant (not shown) mounted to the frame at plate 463 and plate 464, an upper portion of steering subsystem 452, fuel tank 454, battery (not shown) located below fuel tank 454, oil cooler (not shown) located to the rear of the battery and under fuel tank 454, internal combustion engine 460 (with air intakes, carburetor, starter motor), manual transmission 461 (integral with engine), primary chain drive 602, and exhaust system 456. In addition, frame 402 supports a driver and passenger with a saddle seat (not shown, but mounted over fuel tank 454 and engine 460) and pegs 606 and 608. Shift lever 610 for controlling manual transmission 461 is located forward of peg 606.

In addition to frame 402, base 404 supports a lower portion of steering system 452 including tie rods 612 and 614, articulated drive train 702, secondary chain drive 704, differential 1108, left expandable shaft assembly 1102, and right expandable shaft assembly 1104. Each expandable shaft assembly includes a spline 1101 that proceeds into and extends out of a journaled collar 1103. Each spline is formed on an outboard shaft that mounts to a backplate assembly. Each collar is affixed to an inboard shaft that turns with differential 1108.

Base 404 is supported by four vehicle supports 411, 421, 431, and 441. Each vehicle support includes a wheel 412, 422, 432, 442 and tire 413, 423, 433, 443 mounted to a hub (not shown) that turns on a backplate assembly 414, 424, 434, 444 (also called a backplate). The wheel, tire, hub, and backplate may be of conventional construction. The backplate assembly may include one or more brake calipers and one or more wheel bearings or a spindle, all of conventional construction. Each vehicle support 411, 421, 431, and 441 includes a respective lower arm 415, 425, 435, 445 and shock absorber 416, 426, 436, 446 that connect the vehicle support to the base. Base 404 provides groups of devises 711, 721, 731, 741 for pivotally attaching lower arms 415, 425, 435, 445 and for pivotally attaching camber controllers 811, 821, 1131, and 1141.

Each lower arm 415, 425, 435, 445 includes a clevis 812, 822, 1132, 1142 for supporting a respective lower end of each shock absorber 416, 426, 436, 446. Each lower arm can move downward until abutting a stop 419, 429, 439, 449 adjacent to the clevis that hinges the lower arm to the base. Base 404 provides a clevis 814, 824, 634, 644 for mounting a respective upper end of each shock absorber 416, 426, 436, 446.

All of the devises discussed above include a respective pin for providing pivoting of the supported object on a respective axis of the pin with respect to the clevis.

Each camber controller 811, 821, 1131, and 1141 includes a tilt arm 418, 428, 438, 448, a control arm 618, 628, 638, 648, and a link arm 817, 827, 1137, 1147.

Figure 8:
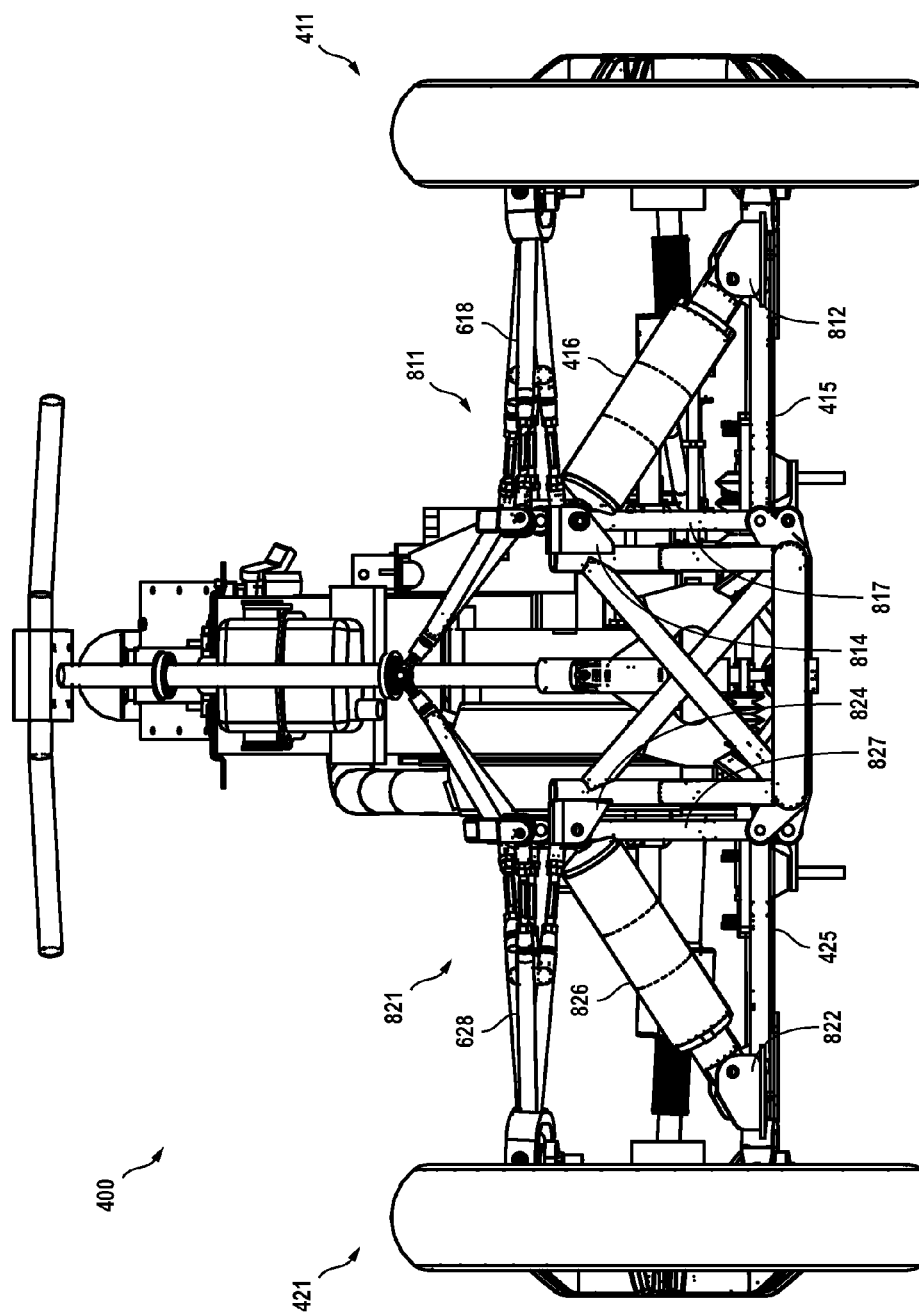
FIG. 8 is a plan view of the front of the vehicle of FIG. 4 where the frame is at a straight ahead operating position with respect to the base.
Figure 9:
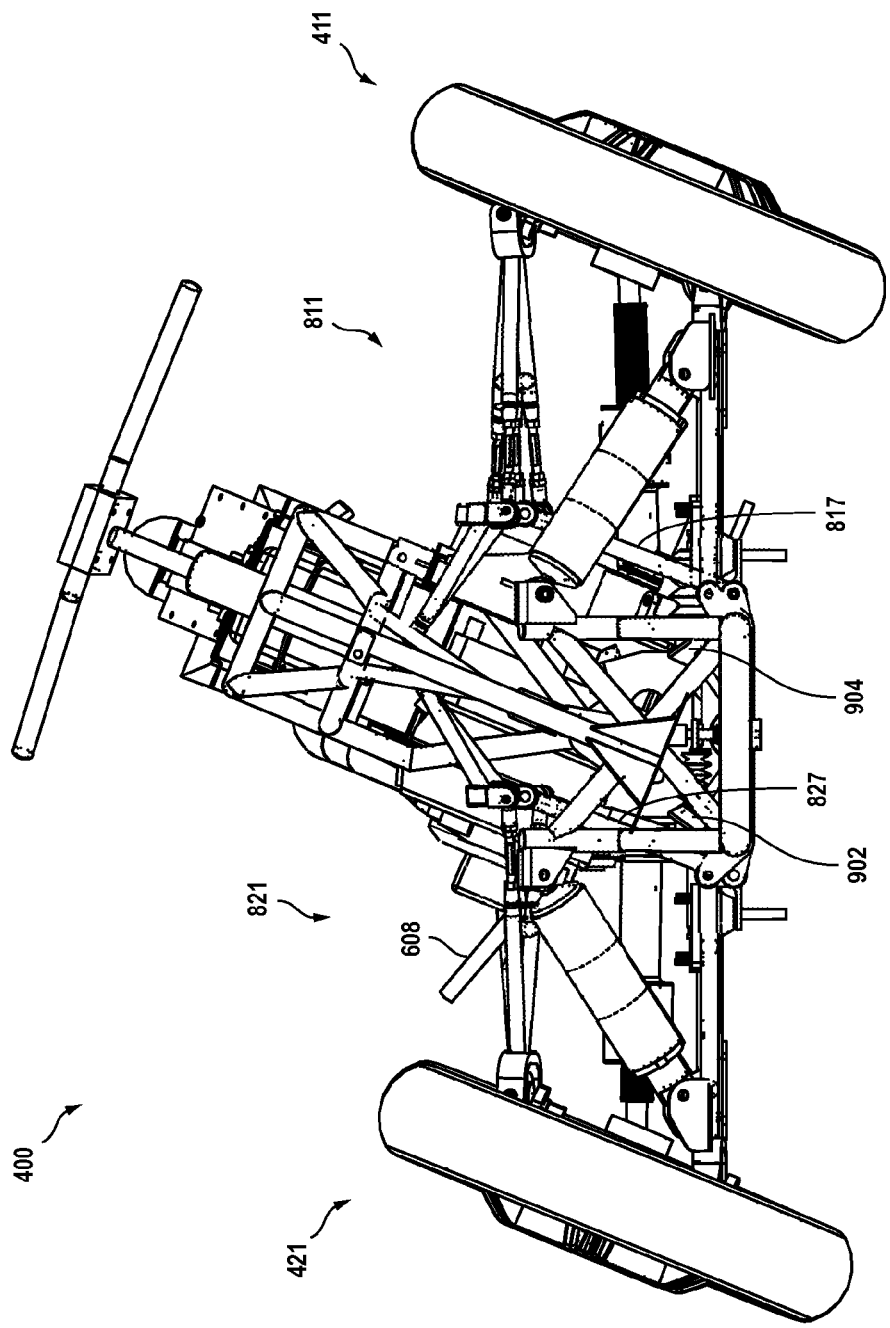
FIG. 9 is a plan view of the front of the vehicle of FIG. 4 where an upper portion of the frame is at a position left of a straight ahead operating position.

In FIG. 8, control arms 618, 628 of the front vehicle supports 411, 421 partially obscure control arms 638, 648 of the rear vehicle supports 431, 441.

Figure 10:
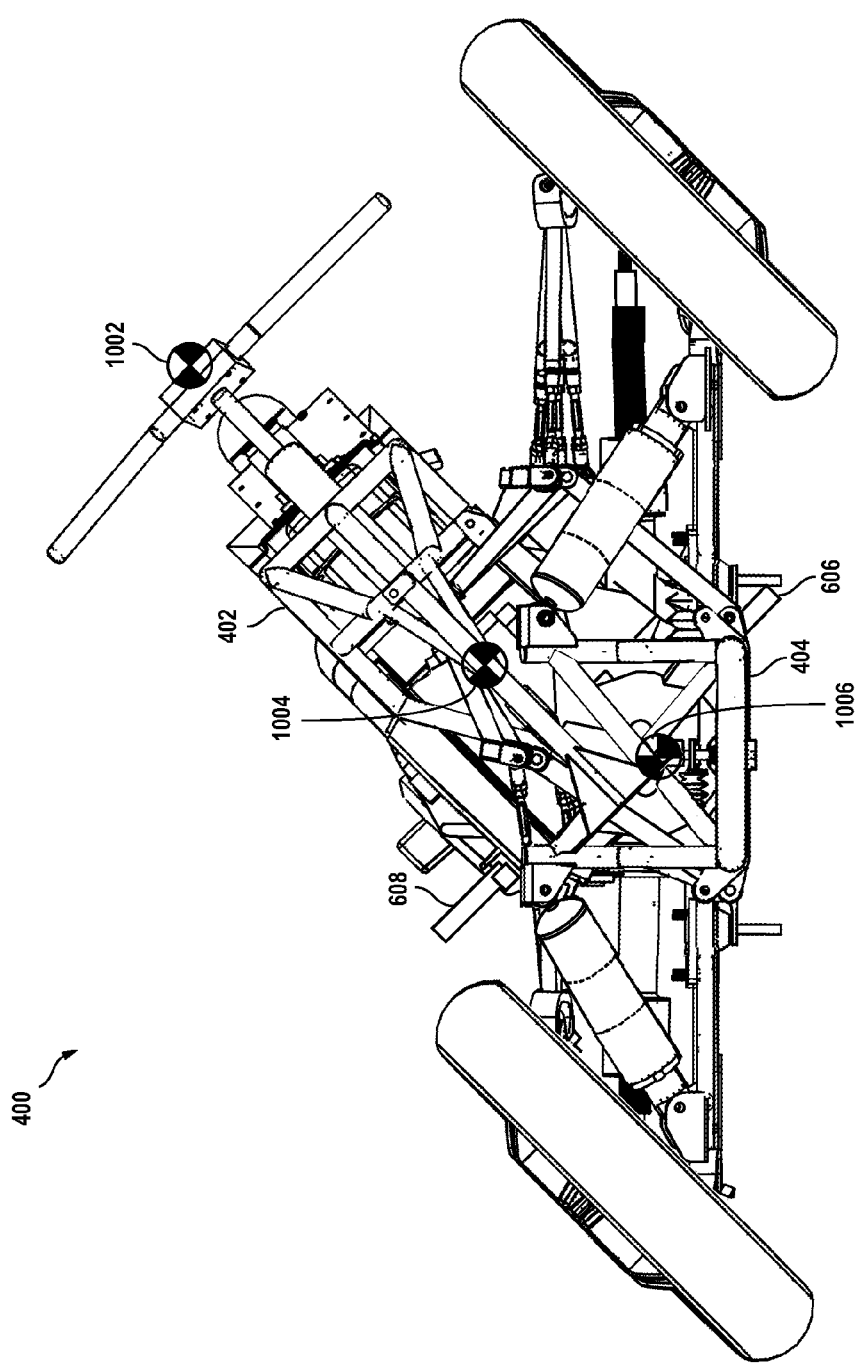
FIG. 10 is a plan view of the front of the vehicle of FIG. 9 showing the center of mass for each of the base, the frame, and a representative center of mass of a driver.
Figure 11:
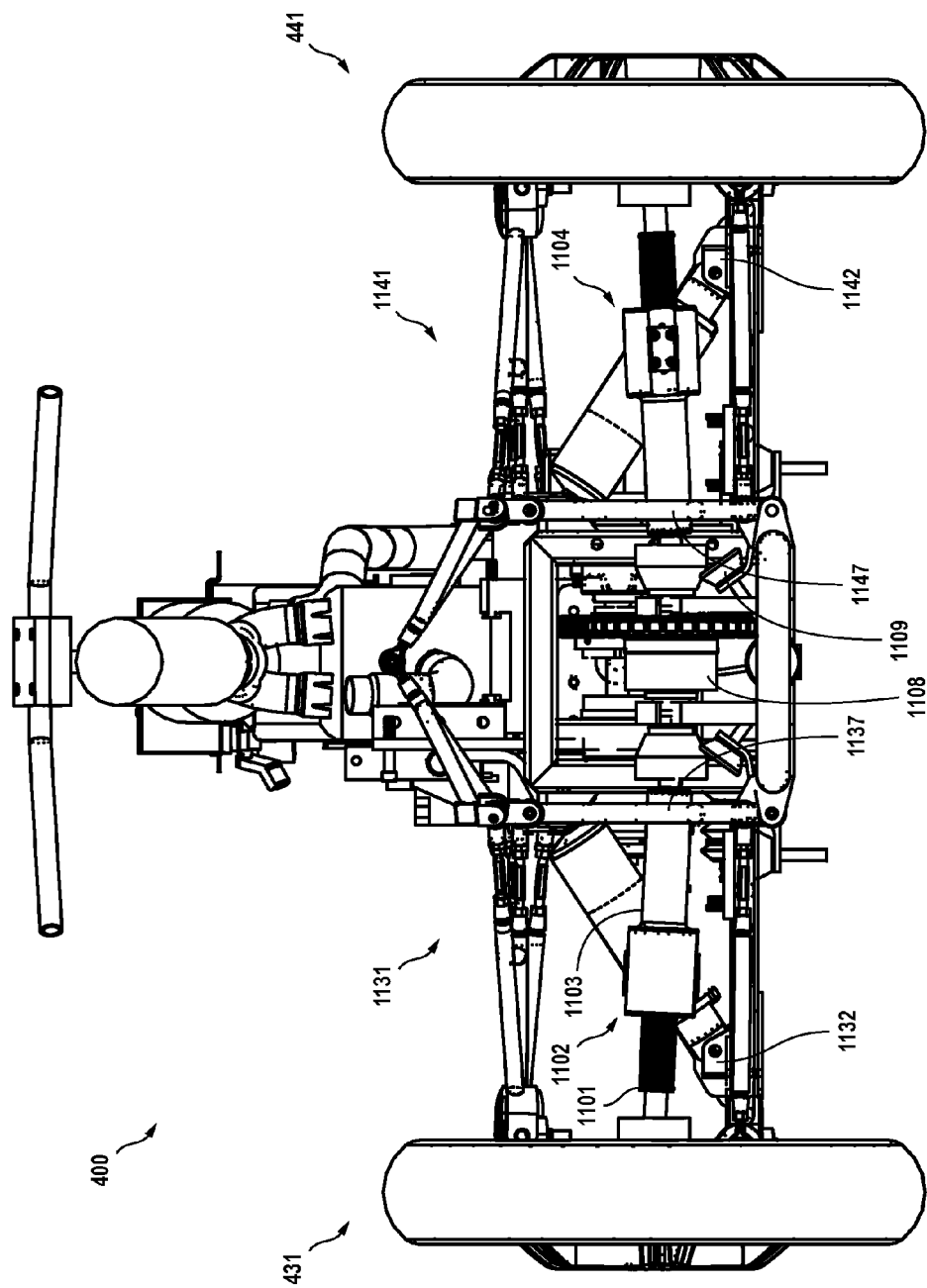
FIG. 11 is a plan view of the rear of the vehicle of FIG. 4 where the frame is at a straight ahead operating position with respect to the base.

In FIG. 10, a center of mass of an average driver supported by a seat and pegs 606, 608 as discussed above is identified at 1002, a center of mass of frame 402 and all components it supports (without the driver) is identified at 1004, and a center of mass of base 404 without the frame is identified at 1006.

Figure 12:
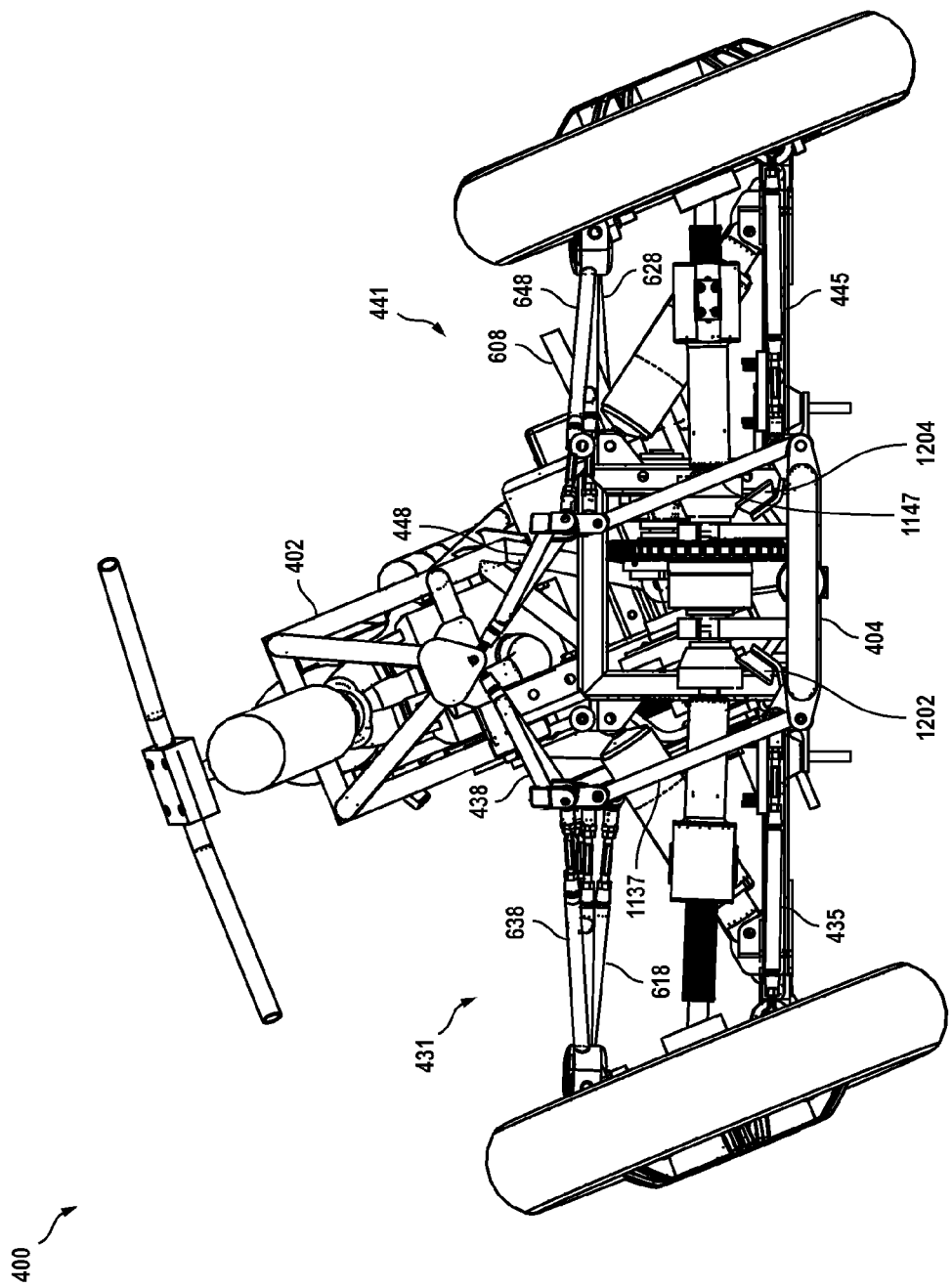
FIG. 12 is a plan view of the rear of the vehicle of FIG. 11 where an upper portion of the frame is at a position left of a straight ahead operating position.

The geometry discussed with reference to FIG. 3 for a vehicle proceeding into the page with negative camber is apparent in vehicle 400 of FIG. 12 shown proceeding into the page. A comparison of FIGS. 11 and 12 evidences the rigid portions corresponding to segments of FIG. 3 and pivots corresponding to points of FIG. 3.

In FIG. 12 control arms 638, 648 of the rear vehicle supports 431, 441 partially obscure control arms 618, 628 of the front vehicle supports 411, 421. The hinge axes of link arms 1137 and 1147, hinged to base 404, are slightly lower than the hinge axes of lower arms 435 and 445.

Figure 13:
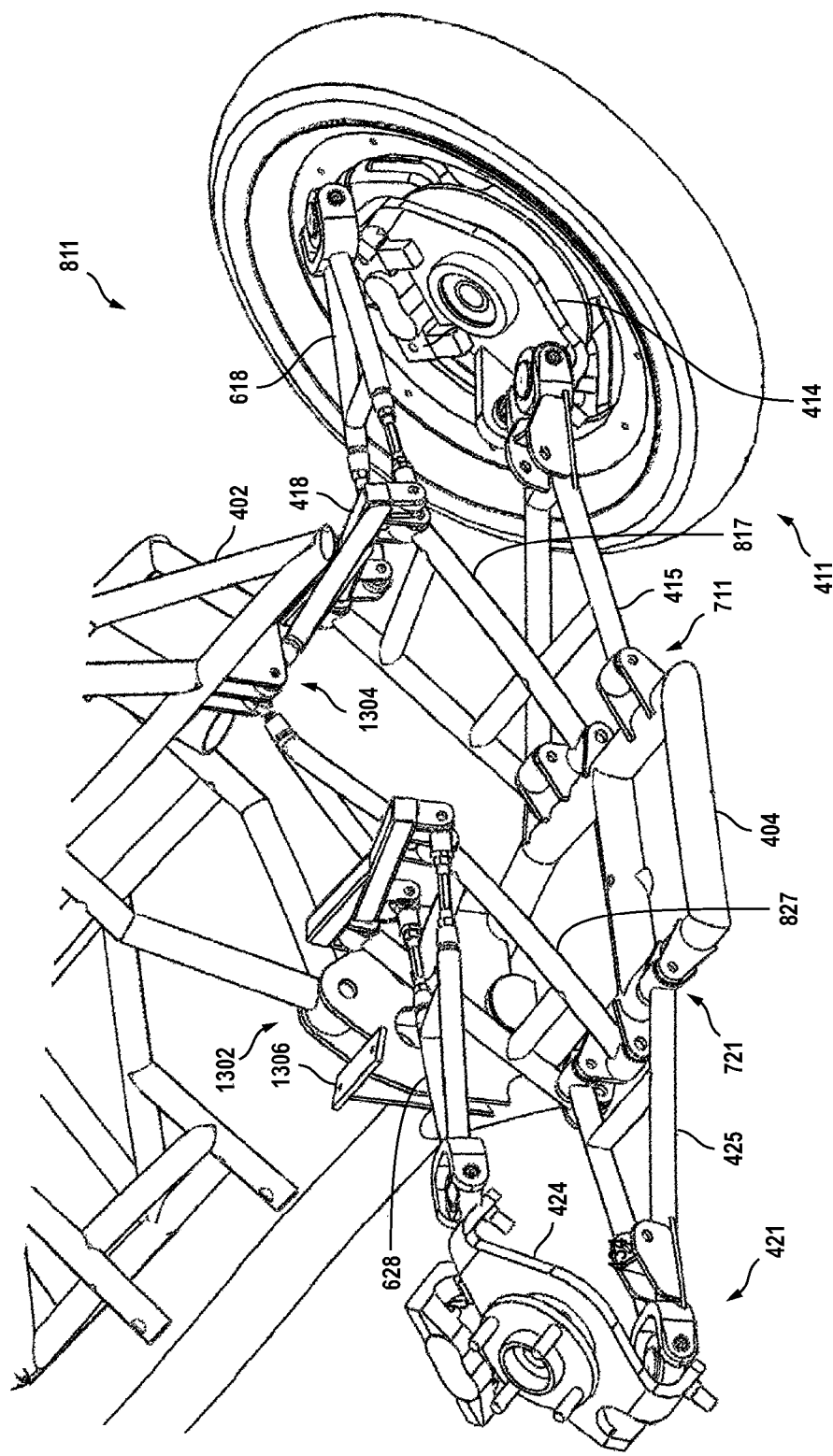
FIG. 13 is a partial plan view of a front portion of the vehicle of FIG. 5 showing the left front wheel.

In FIG. 13, vehicle support 421 is shown without wheel 422 and tire 423. Pivotal connections of control arms 618, 628 and lower arms 415, 425 are made to backplates 414 and 424 using ball joints. Clevises 711 (721) for lower arms and link arms are interdigitated. Pivots 1304 for tilt arms are longitudinally stacked.

The rear wheels are aligned to follow the same tracks as the front wheels, according to the implementation of vehicle 400 discussed above. Lower arms are of identical length. All four tires may be of the type used on the front fork of motorcycles having a rounded surface to facilitate camber adjustment. By using the same tire on front and rear wheels, essentially identical tracking is achieved. In one implementation, an 18×3.5 touring tire with heavy duty side walls and steel belted radial construction is used.

Stops are used to protect velocity joints from forces that would otherwise move the inner joint part past a maximum articulating angle. Stops may abut lower arms (e.g., 419, 429, 439 and 449 abut arms 415, 425, 435, and 445) or link arms (e.g. 904, 902, 1202 and 1204 abut arms 817, 827, 1137, 1147).

A camber controller, in one implementation according to various aspects of the present invention includes a first arm pivotally attached to the frame, a junction, and a second arm pivotally attached to the first arm at the junction and pivotally attached to the base. The junction of the first arm and the second arm provides horizontal (transverse) force to affect adjusting and maintaining of a desired camber, for example, via a conventional control arm.

In one embodiment, the first arm is called a tilt arm and the second arm is called a link arm. A tilt arm may provide devises for hinged attachment of the link arm. A tilt arm may in addition provide devises for hinged attachment of a control arm, discussed above.

Figure 14A:
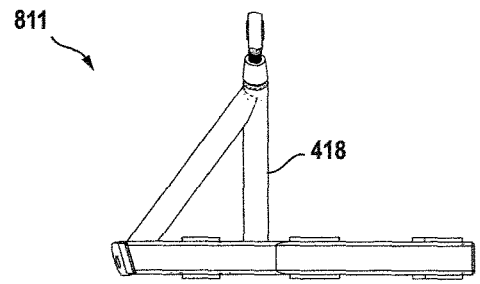
FIGS. 14A, B, and C are plan views of the top, front, and left side of a portion of the camber controller for the left front wheel of the vehicle of FIG. 4.
Figure 14B:
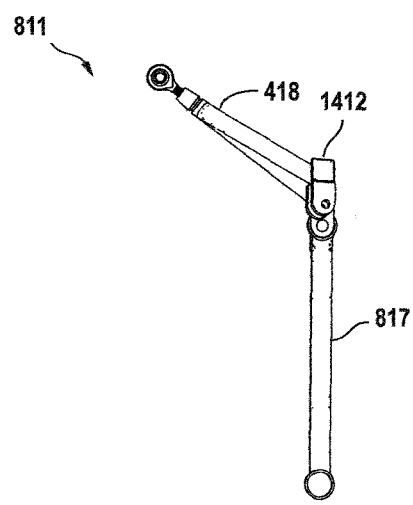
Figure 14C:
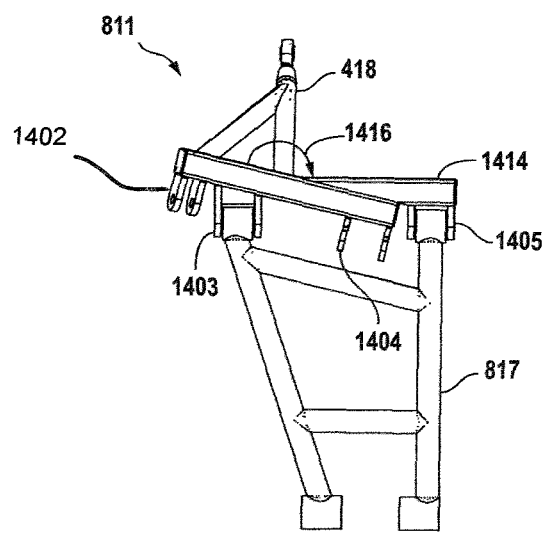

For example, camber controller 811 for a front left vehicle support of FIGS. 14A, 14B, and 14C includes tilt arm 418 pivotally mounted to link arm 817. Views in FIGS. 14A, B, and C are drawn to scale. Link arm 817 turns on an axis through devises 1403 and 1405 that is parallel to a longitudinal axis of vehicle 400 and parallel to a horizontal reference line. Tilt arm 418 provides devises 1402 and 1404 for pivotally mounting control arm 618 (not shown). The axis of clevis 1402 differs from the axes of devises 1403, 1404, and 1405. The axis of clevis 1404 differs from the axis of devises 1403 and 1405. Variation in axes of devises 1402 and 1404 inter alia, allows a control arm constructed of straight segments to counteract a tendency of vehicle 400 to pitch forward when braking. Tilt arm 418 includes a first clevis support 1412 (for devises 1402, 1403, and 1404) and a second clevis support 1414 (for clevis 1405). Second clevis support 1414, in one implementation, is parallel to a horizontal reference. Second clevis support 1414 is welded to first clevis support 1412 at an angle 1416 to the horizontal reference in the range of from about 150 degrees to about 175 degrees, for example, about 166.7 degrees. In other tilt arms according to various aspects of the present invention, angle 1416 is in the range of about 135 degrees to about 175 degrees.

Figure 15:
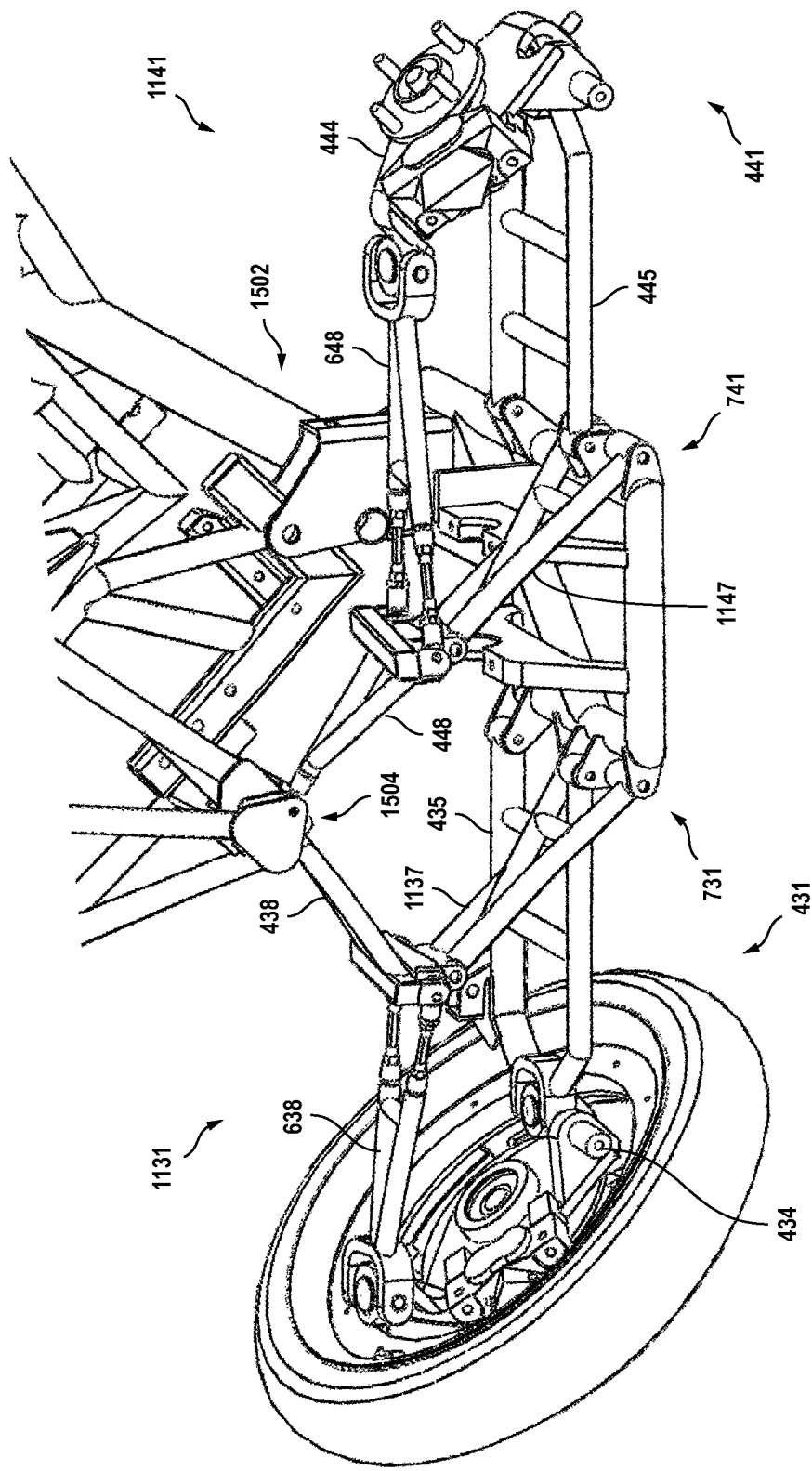
FIG. 15 is a partial plan view of a rear portion of the vehicle of FIG. 5 showing the left rear wheel.

In FIG. 15, vehicle support 441 is shown without wheel 442 and tire 443. Pivotal connections of control arms 638, 648 and lower arms 435, 445 are made to backplates 434 and 444 using ball joints. Clevises 731 (741) for lower arms and link arms are interdigitated. Pivots 1504 for tilt arms are longitudinally stacked.

Figure 16A:
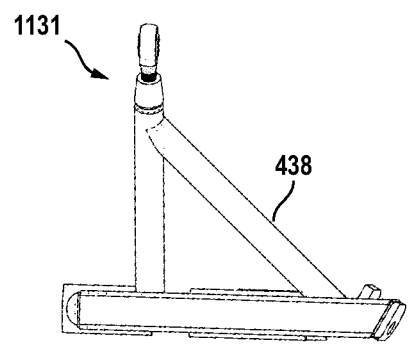
FIGS. 16A, B, and C are plan views of the top, front, and left side of a portion of the camber controller for the left rear wheel of the vehicle of FIG. 5.
Figure 16B:
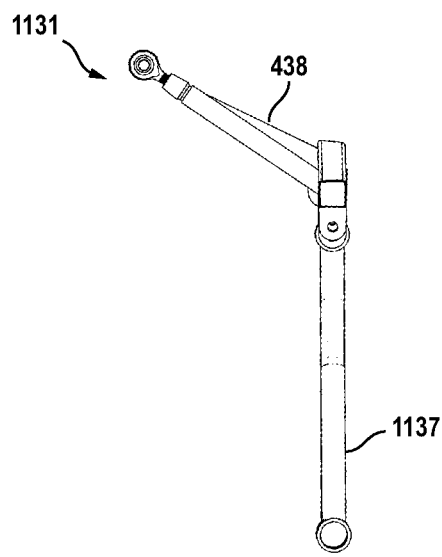
Figure 16C:
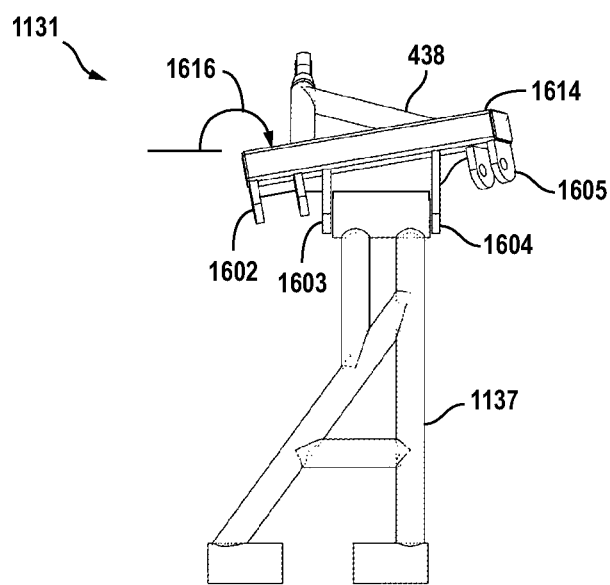

For example, camber controller 1131 for a left rear vehicle support of FIGS. 16A, 16B, and 16C includes tilt arm 438 pivotally mounted to link arm 1137. Link arm 1137 turns on an axis through devises 1603 and 1604 that is parallel to a longitudinal axis of vehicle 400 and parallel to a horizontal reference line. Tilt arm 438 provides devises 1602 and 1605 for pivotally mounting control arm 638 (not shown). The axis of clevis 1602 differs from the axes of devises 1603, 1604, and 1605. The axis of clevis 1605 differs from the axis of devises 1603 and 1604. The axis of devises 1603 and 1604 in one implementation is parallel to a horizontal reference. Variation in axes of devises 1602 and 1604 inter alia, allows a control arm constructed of straight segments to counteract a tendency of vehicle 400 to pitch rearward when accelerating. Tilt arm 438 includes a linear clevis support 1614 (for devises 1602, 1603, 1604, and 1605). Clevis support 1614 makes an angle 1616 to the horizontal reference in the range of from about 150 degrees to about 175 degrees, for example about 170.2 degrees. In other tilt arms according to various aspects of the present invention, angle 1616 is in the range of about 135 degrees to about 175 degrees.

Examples of vehicles and methods performed by vehicles, according to various aspects of the present invention, include the following.

A vehicle, in a first example, follows a curve in a path on a way. The vehicle includes a frame, a base, a plurality of vehicle supports, and a camber controller. The frame supports a driver. The base supports the frame and permits movement of the frame with respect to the base. The plurality of vehicle supports each contribute to supporting the base. Each vehicle support is biased from the base against the way and not from the frame against the way. A camber controller adjusts a camber of at least one vehicle support of the plurality of vehicle supports in accordance with a position of the frame with respect to the base. Movement toward the position being promoted by a shifting of the driver's mass by the driver toward a center of curvature of the curve in the path.

A method, in a second example, is performed by a vehicle when following a curve in a path on a way. The method includes in any practical order: supporting a driver with a frame of the vehicle; supporting the frame with a base of the vehicle; supporting the base with a plurality of vehicle supports that each contribute to supporting the base, each vehicle support biased from the base against the way and not from the frame against the way; responding to the driver's mass being shifted by the driver toward a center of curvature of the curve in the path by moving the frame with respect to the base toward a position; and adjusting a camber of at least one vehicle support of the plurality of vehicle supports in accordance with the position of the frame with respect to the base.

Another method, in a third example, is performed by a land vehicle for improving traction when following a curve in a road. The vehicle includes a base having a central longitudinal axis that generally coincides with a direction of travel of the vehicle on the road; a frame for supporting a driver of the vehicle; a left wheel having a first axis of rotation; and a right wheel having a second axis of rotation. The left wheel is mechanically coupled to the base on the left of the longitudinal axis with a left independent suspension mechanism that biases the left wheel against the road over a range of vertical motion of the left wheel. A first dimension of the left mechanism varies in response to the vertical motion of the left wheel. The right wheel is mechanically coupled to the base on the right of the longitudinal axis with a right independent suspension mechanism that biases the right wheel against the road over a range of vertical motion of the right wheel. A second dimension of the right mechanism varies in response to the vertical motion of the right wheel. The method includes, in any practical order: allowing motion of the frame with respect to the base; and adjusting a camber of the left wheel and a camber of the right wheel in response to the motion of the frame, Motion of the frame reduces a first distance from the center of mass of the vehicle to the road and reduces a second distance from the center of mass of the vehicle to the center of curvature of the curve in the road. Motion of the frame does not reduce the first dimension or the second dimension.

Still another method, in a fourth example, is performed by a land vehicle for improving traction when following a curve in a road. The vehicle includes a base comprising a pivot, the base having a central longitudinal axis through the pivot that generally coincides with a direction of travel of the vehicle on the road; a frame supported by the base via the pivot, the frame for supporting a driver of the vehicle; a left wheel having a first axis of rotation; and a right wheel having a second axis of rotation. The left wheel is mechanically coupled to the base on the left of the longitudinal axis with a left independent suspension mechanism that biases the left wheel against the road over a range of vertical motion of the left wheel. A first dimension of the left mechanism varies in response to the vertical motion of the left wheel. The right wheel is mechanically coupled to the base on the right of the longitudinal axis with a right independent suspension mechanism that biases the right wheel against the road over a range of vertical motion of the right wheel. A second dimension of the right mechanism varies in response to the vertical motion of the right wheel. The method includes in any practical order: allowing motion of the frame with respect to the base via the pivot; and adjusting a camber of the left wheel and a camber of the right wheel in response to the motion of the frame. Motion of the frame tends to make parallel a line, that includes a center of mass of the frame and a point of the longitudinal axis, with a direction of a vector sum, at the center of mass of the frame, of a transverse force and a gravitational force. Motion of the frame does not reduce the first dimension or the second dimension.

A land vehicle, in a fifth example, is capable of improved traction when following a curve in a road. The vehicle includes a base, a frame, a coupling, a left wheel, and a right wheel. The base includes a central longitudinal axis that generally coincides with a direction of travel of the vehicle on the road. The frame supports a driver of the vehicle, the frame supported by the base. The coupling allows the frame to move with respect to the base. The left wheel includes a first axis of rotation. The left wheel is mechanically coupled to the base on the left of the longitudinal axis with a left independent suspension mechanism that biases the left wheel against the road over a range of vertical motion of the left wheel. A first dimension of the left mechanism varying in response to the vertical motion of the left wheel. The right wheel includes a second axis of rotation, the right wheel is mechanically coupled to the base on the right of the longitudinal axis with a right independent suspension mechanism that biases the right wheel against the road over a range of vertical motion of the right wheel. A second dimension of the right mechanism varies in response to the vertical motion of the right wheel. Motion of the frame adjusts a camber of the left wheel and a camber of the right wheel. Motion of the frame tends to make parallel a line, that includes a center of mass of the driver and a center of mass of the frame, with a direction of a vector sum, at the center of mass of the driver, of a transverse force and a gravitational force. Motion of the frame does not reduce the first dimension or the second dimension.

A land vehicle, in a sixth example, is capable of improved traction when following a curve in a road. The vehicle includes a base, a frame, a left wheel, and a right wheel. The base includes a pivot. The base includes a central longitudinal axis through the pivot that generally coincides with a direction of travel of the vehicle on the road. The frame is support by the base via the pivot. The frame supports a driver of the vehicle. The pivot allows motion of the frame with respect to the base. The left wheel includes a first axis of rotation. The left wheel is mechanically coupled to the base on the left of the longitudinal axis with a left independent suspension mechanism that biases the left wheel against the road over a range of vertical motion of the left wheel. A first dimension of the left mechanism varies in response to the vertical motion of the left wheel. The right wheel includes a second axis of rotation. The right wheel is mechanically coupled to the base on the right of the longitudinal axis with a right independent suspension mechanism that biases the right wheel against the road over a range of vertical motion of the right wheel. A second dimension of the right mechanism varies in response to the vertical motion of the right wheel. Motion of the frame adjusts a camber of the left wheel and a camber of the right wheel. Motion of the frame tends to make parallel a line, that includes a center of mass of the frame and a point of the longitudinal axis, with a direction of a vector sum, at the center of mass of the frame, of a transverse force and a gravitational force. Motion of the frame does not reduce the first dimension or the second dimension.

An articulated drive train, according to various aspects of the present invention, transfers power from a prime mover supported by a frame to an axle supported by a base while the frame moves in an arc with respect to the base. The base supports the frame and allows the frame limited movement with respect to the base. Movement may be limited to movement at a fixed radius from a center of curvature. In one implementation, the prime mover provides power via a first sprocket (or pulley) that rotates in a first plane and the axle accepts power via a second sprocket (or pulley) that rotates in a second plane. The first plane moves in an arc of a circle at a fixed radius. The center of the circle may be in an axis of movement of the prime mover. The axis of movement may be within the second plane. The axis of movement may be spaced from the second plane and not intersect the second plane. Coupling of the first sprocket to the second sprocket is accomplished with a shaft. The shaft is supported by a universal joint at each end. In one implementation, coupling is accomplished with a first chain (belt, or toothed belt), a sprocket (or pulley) mounted to a first universal joint for the shaft, the shaft, a sprocket (or pulley) mounted to a second universal joint for the shaft, and a second chain (belt, or toothed belt). The first chain on the first sprocket is maintained in alignment with the sprocket mounted to the first universal joint for the shaft. The second chain on the second sprocket is maintained in alignment with the sprocket mounted to the second universal joint for the shaft. For example, a vehicle discussed above with reference to FIGS. 1, 2, and 3 may include an articulated drive train for transferring power from a prime mover of the frame to vehicle supports of the base.

The principles of gear ratios for sprockets or radii ratios for pulleys may be used to transmit power with a desired range of RPM and related range of torque.

A land vehicle propelled by two wheels may include an articulated drive train according to various aspects of the present invention. Power through the articulated drive train may propel the vehicle, for example, by turning an axle to which the wheels are coupled. For example, vehicle 400 of FIGS. 4-16 may include articulated drive train 702 of FIG. 17. Each of the components shown in FIG. 17 may be of conventional construction. Coupling these components to form articulated drive train 702 may be accomplished with conventional techniques including welding and/or fasteners. Rotating components are supported with conventional bearings unless otherwise noted.

Vehicle 400 includes engine 460 and wheeled vehicle supports 431 and 441 each comprising an expandable shaft 1722 and 1730. Power from engine 460 is delivered through articulated drive train 702 to wheels 432 and 442 of vehicle supports 431 and 441. Engine 460 is supported by frame 402. Frame 402 is supported by base 404. Frame 402 is allowed to pivot on base 404 about axis 1702. A shaft 1712 couples torque produced on frame 402 to a load on base 404. In this implementation, this torque propels vehicle 400.

Articulated drive train 702 includes a portion subject to movement about axis 1702 including sprocket 1704, chain 602, sprocket 1706 and part of constant velocity joint 1708. Articulated drive train 702 includes a portion not subject to movement about axis 1702 including part of constant velocity joint 1716, sprocket 1718, chain 604, sprocket 1726, and differential 1108. The driven components of articulated drive train 702 include symmetric vehicle supports. Each vehicle support 431 (and 441) comprises an inboard constant velocity joint 1724 (1728), expandable shaft 1722 (1730), an outboard constant velocity joint 1720 (1732), and a wheel 432 (442).

To couple the portion of articulated drive train 702 that is subject to movement about axis 1702 to the portion of articulated drive train 702 that is not subject to such movement, articulated drive train 702 include a shaft 1712 supported between constant velocity joint 1708 and constant velocity joint 1716.

Each constant velocity joint discussed herein includes an outer joint part with outer ball tracks, an inner joint part with inner ball tracks, torque transmitting balls guided by pairs of outer and inner ball tracks positioned in corresponding meridian planes, and a ball cage. The ball cage receives the balls in circumferentially distributed windows, holds the balls in a common plane and guides the balls onto the angle-bisecting plane when the joint is articulated. The articulation angle is limited by the thickness of the shaft connected to the inner joint part. At the extreme of articulation, this shaft abuts an inner cone of the outer joint part. The balls are prevented from leaving the track ends by design of the track to extend a safe distance beyond the position of the balls when the joint is at its maximum articulation angle.

The outer joint part of constant velocity joint 1708 is fixed to sprocket 1706 and pivots with frame 402. The inner joint part of constant velocity joint 1708 is fixed to shaft 1712. The inner part of constant velocity joint 1716 is fixed to shaft 1712. The outer joint part of constant velocity joint 1716 is fixed to sprocket 1718 and does not pivot with frame 402.

Figure 17:
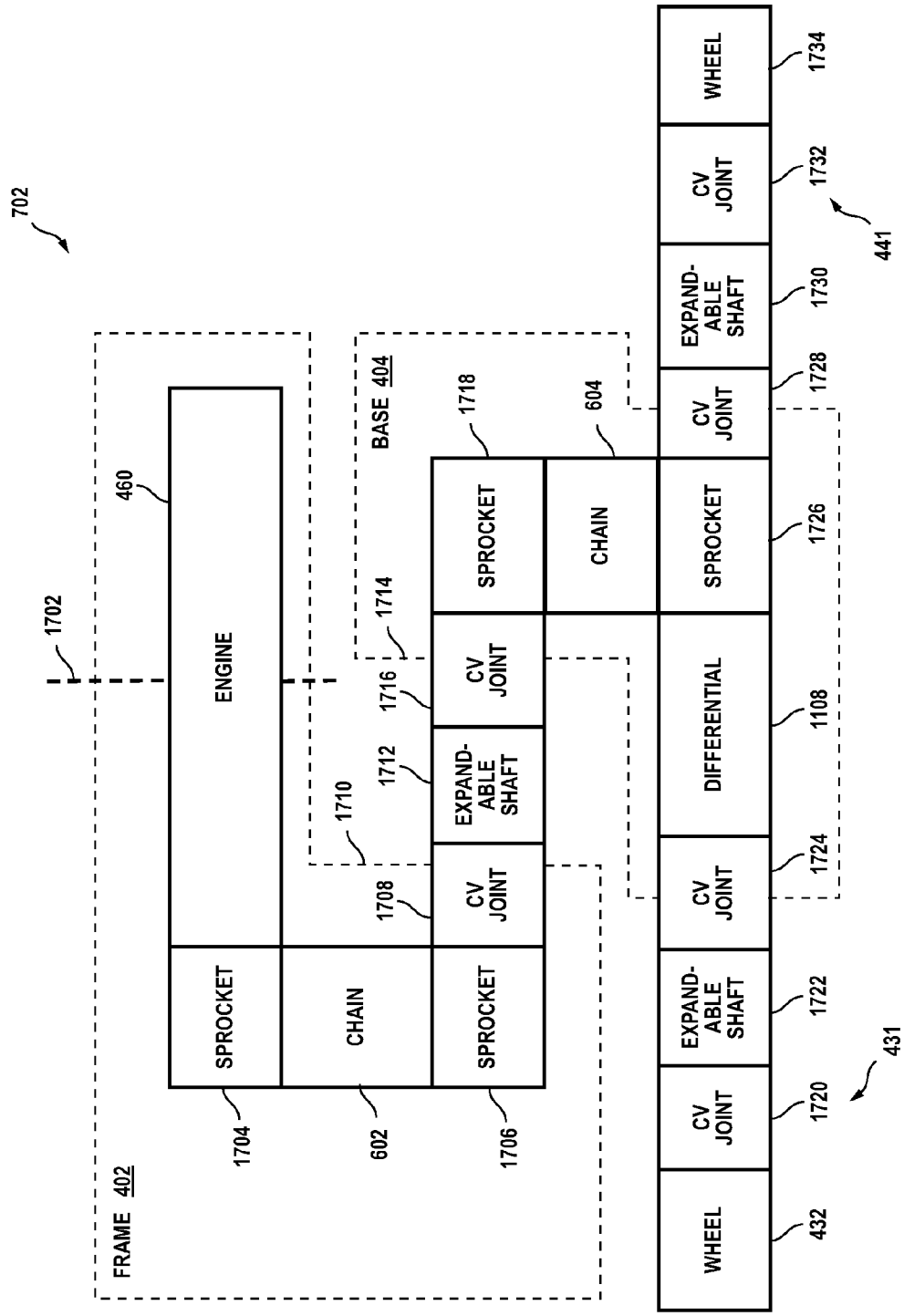
FIG. 17 is a functional block diagram of an articulated chain drive subsystem, according to various aspects of the present invention.

Frame 402, engine 460, and the portion of articulated drive train 702 that moves with frame 402 move as a unit into the plane of FIG. 17 (i.e., the page) about axis 1702, and out of the plane of FIG. 17 by a symmetric amount, for example up to about 44 degrees in each direction from a straight ahead operating position of frame 402. Axis 1702 is aligned with a longitudinal axis of vehicle 400.

As shown, chains 602 and 604 are not aligned on axis 1702. For example, sprocket 1704, chain 602, and sprocket 1706 may be aligned in a common plane (for proper operation of chain 602) to the left of axis 1702. Sprocket 1718, chain 604, and sprocket 1726 may be aligned (for proper operation of chain 604) in a common plane, for example to the right of axis 1702. One of constant velocity joints 1708 and 1716 is located on or relatively close to axis 1702. As shown, a generally central axis 1714 of constant velocity joint 1716 may be located on or just to the right of axis 1702.

In response to movement of frame 402 with respect to base 404, the inner joint part of constant velocity joint 1716 moves into and out of the plane of FIG. 17 about axis 1714, shaft 1712 moves into and out of the plane of FIG. 17, and the entire constant velocity joint 1708 moves into and out of the plane of FIG. 17. Each constant velocity joint 1708 and 1716 articulates about a generally central axis (1710, 1714) to an extent that is half the angle (e.g., about +/−22 degrees) of movement of frame 402 about axis 1702.

Articulated drive train 702 may require accommodation of substantial transverse movement as frame 402 moves from one extreme to the other. One or both constant velocity joints 1708 and 1716 may allow for some or all of such transverse movement, that is, relative expansion of the inner joint part from the outer joint part. Shaft 1712 may comprise telescoping sections.

According to various aspects of the present invention, power transmitted through an articulated drive train is transmitted at reduced RPM and increased torque. For example, sprocket 1704 rotates with a relative RPM of 100%. Sprocket 1706, shaft 1712, and sprocket 1718 may rotate at a relative RPM of about 50%. Sprocket 1726, differential 1108, and the moving parts of both vehicle supports may rotate at an average relative RPM of 100%. Of course, differential 1108 may effect a difference in RPM of one wheel 432 with respect to the other wheel 442. Sprocket tooth ratios accomplish the changes in RPM.

Constant velocity joints in vehicle supports permit biasing of wheels 432 and 442 against bumps and holes in the way. For example, constant velocity joints 1720, 1724, 1728, and 1732 permit wheels 432 and 442 to move into and out of the plane of FIG. 17 over bumps and holes in the way. In response to movement of a vehicle support 431 (441) with respect to base 404, the inner joint part of constant velocity joint 1724 (1728) moves into and out of the plane of FIG. 17, expandable shaft 1722 (1730) moves into and out of the plane of FIG. 17, and the entire constant velocity joint 1720 (1732) and wheel 432 (442) moves into and out of the plane of FIG. 17.

Figure 18:
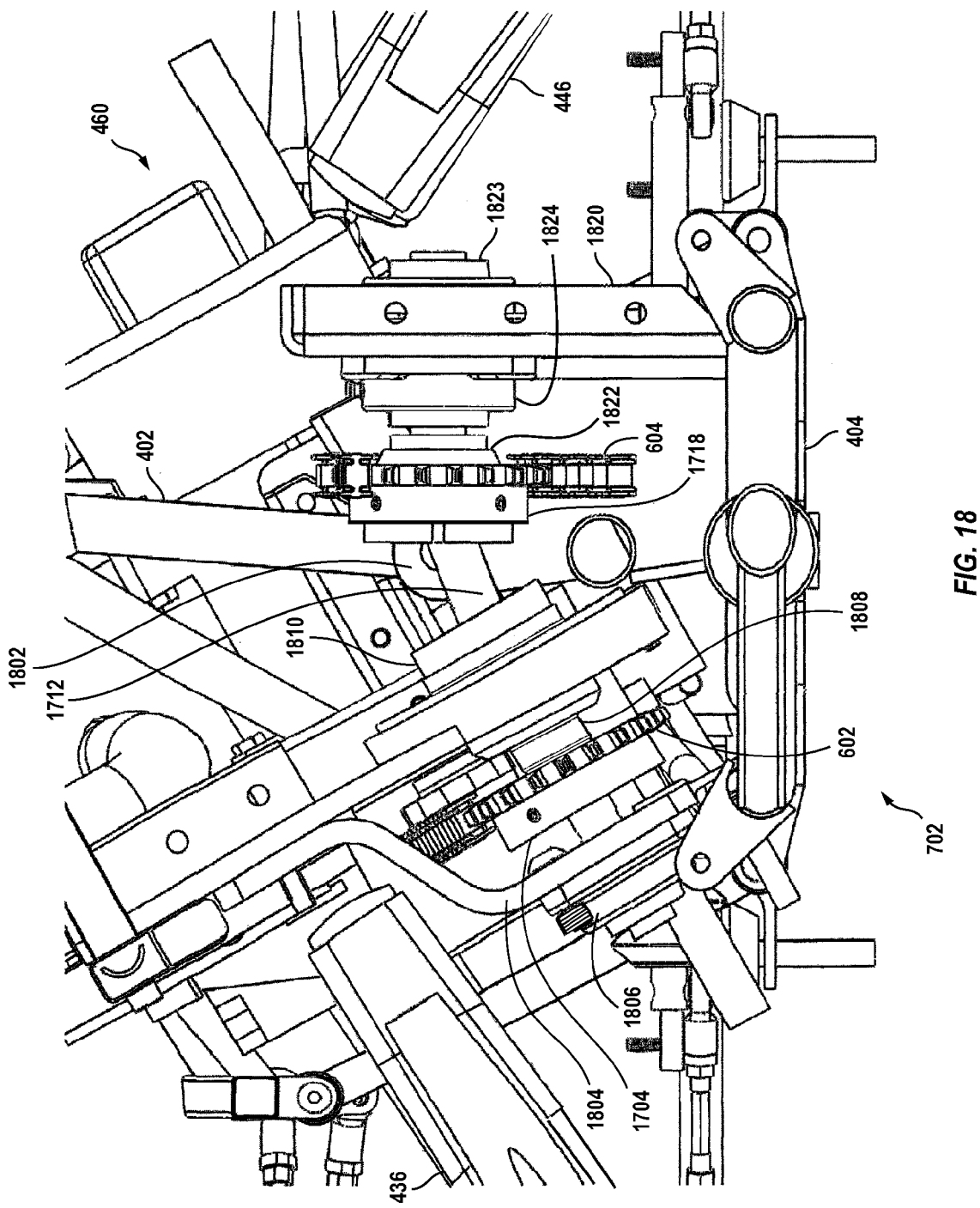
FIG. 18 is a partial plan view of a rear portion of the vehicle of FIG. 5 showing an implementation of the articulated chain drive subsystem of FIG. 17.

Vehicle 400 of FIG. 18 includes an implementation of articulated drive train 702 as discussed above. In FIG. 18, frame 402 is positioned at a maximum counterclockwise rotation about axis 1702. Frame 402 is supported on pivot 1802 fixed to base 404. Bracket 1804 is supported by frame 402. Bracket 1804 supports sprocket 1704 and chain 602 between bearings 1806 and 1808, supports the outer joint part 1810 of constant velocity joint 1708, and supports to some extent shaft 1712. Shaft 1712 has transverse movement of up to about 0.030 inch within constant velocity joint 1708. Shaft 1712 is fixed to the inner joint part of constant velocity joints 1708 and 1716. Transverse movement of shaft 1712 within constant velocity joint 1716 is less than about 0.006 inch. Base 404 supports bracket 1820. Bracket 1820 supports the cantilever combination of outboard bearing 1823, inboard bearing 1824, sprocket 1718, chain 604, outer joint part 1822 of constant velocity joint 1716, and to some extent shaft 1712. In one implementation the offset load of the cantilever combination is supported by two flange bearings (1823, 1824) with a center to center distance of about 2.8 inches. The sprocket is beyond the inboard flange bearing 1824 by a center to center distance of about 1.7 inches.

Examples of vehicles and methods performed by vehicles, according to various aspects of the present invention, include the following.

A vehicle, in a first example, transports a driver in a direction of travel on a way, the vehicle includes a base, a frame, an engine, a plurality of vehicle supports, and a drive train. The frame is supported by the base on a first axis in the direction of travel. The frame supports the driver of the vehicle. The base allows movement of the frame about the first axis during travel. The engine is supported by the frame and moves with the frame about the first axis. The plurality of vehicle supports support the base from the way. A particular vehicle support of the plurality is capable of receiving rotational power to propel the vehicle. The drive train transmits a rotational power from the engine to the particular vehicle support. The drive train includes a first chain drive that moves with the frame about the first axis. The drive train further includes a second chain drive that, with respect to the frame, moves with the base. The drive train further includes a shaft that includes a first end and a second end. The first end is coupled via a first joint to the first chain drive. The second end is coupled via a second joint to the second chain drive. The first joint, the shaft, and the second joint transmit the rotational power to the particular vehicle support to propel the vehicle on the way without interruption as the engine moves about the first axis during travel.

In another implementation of the vehicle in the first example, the first chain drive is operative in a first plane, the second chain drive is operative in a second plane, and movement of the frame with respect to the base moves the shaft in a third plane that intersects the first axis, the first plane, and the second plane.

In still another implementation of the vehicle in the first example, the shaft is located so that the first axis intersects the shaft.

In yet another implementation of the vehicle in the first example, the first chain drive is operative in a plane, the second chain drive is operative in a plane, movement of the frame with respect to the base moves the shaft in a third plane that intersects the first axis, the first plane, and the second plane, and the shaft is located so that the first axis intersects the shaft.

In another implementation of the vehicle in the first example, the first joint includes a constant velocity joint including an outer joint part and an inner joint part, the first chain drive includes a first sprocket coupled to the engine, a second sprocket coupled to the outer joint part, and a chain coupled to the first sprocket and to the second sprocket. The frame may further include a bracket that supports the second sprocket on a bearing and rigidly supports the outer joint part.

In still another implementation of the vehicle in the first example, the second joint includes a constant velocity joint including an outer joint part and an inner joint part, the second chain drive includes a first sprocket coupled to the outer joint part, a second sprocket coupled to the vehicle support, and a chain coupled to the first sprocket and to the second sprocket. The base may further include a second shaft including a third end and a fourth end, where the base further includes a bracket that supports and retains the third end on a plurality of bearings, and the shaft supports at the fourth end the first sprocket and the outer joint part.

In yet another implementation of the vehicle in the first example, the rotational power includes a first RPM and, by operation of the first chain drive, the shaft rotates at a second RPM less than the first RPM. The second RPM may be about 50% of the first RPM.

In any of the above implementations of the vehicle of the first example, the vehicle support may include a wheel in contact with the way that propels the vehicle in response to the received rotational power.

In any of the above implementations of the vehicle of the first example, the vehicle support may include a track in contact with the way that propels the vehicle in response to the received rotational power.

A method performed by a vehicle transports a payload along a path on a way. The method, in a second example, includes, in any practical order: supporting the payload with a frame; supporting the frame with a base; allowing a change of position of the frame with respect to the base when the vehicle follows a curve on the way; supporting the base from the way with a first vehicle support in contact with the way; adjusting a first camber of the first vehicle support in accordance with the change of position; supporting an engine from the frame so that the engine moves with the frame during the change of position; coupling rotational power from the engine to the first vehicle support via a first axle to propel the vehicle by operation of the first vehicle support against the way, wherein coupling is without interruption as the engine moves with the frame during travel; and expanding a length of the first axle so that adjusting the camber does not interrupt coupling rotational power.

In another implementation of the method of the second example, the method further includes in any practical order: further supporting the base from the way with a second vehicle support in contact with the way; adjusting a second camber of the second vehicle support in accordance with the change of position. In addition, coupling rotational power from the engine includes, in any practical order: coupling rotational power to a differential supported by the base; coupling rotational power from the differential via the first axle to the first vehicle support; and coupling rotational power from the differential via the second axle to the second vehicle support. And, the method further includes expanding a length of the second axle so that adjusting the second camber does not interrupt coupling rotational power.

In still another implementation of the method of the second example, a drive train from the engine to the first vehicle support includes a jointed shaft that facilitates coupling rotational power from the engine to the first vehicle support and facilitates allowing a change of position of the frame with respect to the base.

Throughout vehicle 400, provisions are made to facilitate free movement of frame 402 with respect to base 404. Bearing surfaces between frame 402 and base 404 and linkages are constructed with steel-on-steel at interfaces of components that move with respect to each other. In contrast, other joints and pivots related to biasing of vehicle supports against the way may be constructed with non-metallic materials and/or surfaces at the interfaces of components that move with respect to each other. These other joints and pivots are not intended to operate as freely as the movement of frame 402 with respect to base 404.

For desirable handling characteristics of vehicle 400, scrub of wheels to way is reduced by the dimensions and geometry discussed above. Caster of the vehicle supports is adjusted for reducing pitching of the vehicle during acceleration (also referred to as squat) and braking (also called dive). According to various aspects of the present invention, an implementation as discussed above includes a camber controller that adjusts camber and adjusts caster of the vehicle support to minimize dive and/or squat and to improve cornering capability.

With the dimensions in FIG. 3 and angles discussed above, anti-dive is about 24% and anti-squat is about 17%. In alternate implementations, anti-dive is in the range from about 19% to about 25% and anti-squat is in the range of about 15% to about 20%.

The foregoing description discusses preferred embodiments of the present invention, which may be changed or modified without departing from the scope of the present invention as defined in the claims. As used herein, the term 'generally' is used for explaining a component or process in an implementation where in other implementations of the present invention each of the narrower terms 'substantially', 'primarily', and 'exclusively' is specifically intended to be disclosed and to apply. These relationships correspond to relative effectiveness of the component or process such as generally about 50% effective, substantially about 80% effective, primarily about 95% effective, and exclusively meaning 100% effective. The examples listed in parentheses may be alternative or combined in any manner. The invention includes any practical combination of the structures and methods disclosed. While for the sake of clarity of description several specifics embodiments of the invention have been described, the scope of the invention is intended to be measured by the claims as set forth below.

What is claimed is:

1. A land vehicle capable of improved traction when following a curve in a road, the vehicle comprising:
   a. a base;
   b. a frame supported by the base, the frame for supporting a driver of the vehicle, the frame mechanically coupled to the base for allowing motion of the frame with respect to the base about a central longitudinal axis that generally coincides with a direction of travel of the vehicle on the road; and
   c. a plurality of assemblies, each assembly coupled to the base to support the base away from the road, at least one assembly comprising:
      (1) a vehicle support;
      (2) a first arm and a second arm, each mechanically coupled to the vehicle support so that movement of the first arm with respect to the second arm changes camber of the vehicle support, the second arm mechanically coupled to the base at a first elevation from the road to support the base from the vehicle support;
      (3) a third arm comprising a top end and a bottom end, the bottom end mechanically coupled to the base;
      (4) a shock absorber mechanically coupled to the second arm and mechanically coupled to the base at a second elevation from the road greater than the first elevation; and (5) a fourth arm that mechanically couples the frame to the top end of the third arm and engages the first arm to facilitate the movement of the first arm with respect to the second arm.

2. The vehicle of claim 1 wherein the vehicle support comprises a wheel for rolling contact with the road.

3. The vehicle of claim 1 wherein the frame further supports an engine for propelling the vehicle along the path of the road.

4. The vehicle of claim 1 wherein the fourth arm engages the first arm at an angle to counteract a tendency of the vehicle to pitch during changes of velocity.

5. The vehicle of claim 1 wherein:
   a. the frame is supported by the base at a pivot about the central longitudinal axis; and
   b. a third elevation of the pivot from the road is greater than the first elevation.

* * * * *